(12) United States Patent
Koumura

(10) Patent No.: US 10,239,519 B2
(45) Date of Patent: Mar. 26, 2019

(54) VEHICLE STATE ESTIMATION DEVICE

(71) Applicant: TOYOTA JIDOSHA KABUSHIKI KAISHA, Toyota-shi, Aichi (JP)

(72) Inventor: Shingo Koumura, Okazaki (JP)

(73) Assignee: TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 184 days.

(21) Appl. No.: 15/156,678

(22) Filed: May 17, 2016

(65) Prior Publication Data
US 2016/0339923 A1 Nov. 24, 2016

(30) Foreign Application Priority Data
May 19, 2015 (JP) .................... 2015-102241

(51) Int. Cl.
B60W 40/105 (2012.01)
B60W 30/02 (2012.01)
B60G 17/06 (2006.01)

(52) U.S. Cl.
CPC ............. *B60W 30/02* (2013.01); *B60G 17/06* (2013.01); *B60G 2400/208* (2013.01); *B60G 2500/10* (2013.01); *B60W 2510/227* (2013.01); *B60W 2520/14* (2013.01); *B60W 2520/16* (2013.01); *B60W 2520/28* (2013.01)

(58) Field of Classification Search
CPC ............... B60W 40/105; B60W 30/02; B60W 2510/227; B60G 2400/208
See application file for complete search history.

(56) References Cited

U.S. PATENT DOCUMENTS

| 5,570,289 A * | 10/1996 | Stacey | B60G 17/018 |
| | | | 280/5.504 |
| 5,638,275 A * | 6/1997 | Sasaki | B60G 17/0152 |
| | | | 280/5.505 |
| 7,360,777 B2 * | 4/2008 | Mizuno | B60G 17/056 |
| | | | 280/124.157 |
| 9,919,618 B2 * | 3/2018 | Terada | B60K 6/365 |

(Continued)

FOREIGN PATENT DOCUMENTS

| JP | 6-48139 A | 2/1994 |
| JP | 7-232532 A | 9/1995 |

(Continued)

*Primary Examiner* — Mohamed Charioui
(74) *Attorney, Agent, or Firm* — Sughrue Mion, PLLC

(57) ABSTRACT

Provided is a vehicle state estimation device (10) having a calculation unit (28) that calculates state quantities of at least a sprung of a vehicle based on wheel speeds of front left and right wheels and rear left and right wheels detected by detection devices. The calculation unit (28) calculates in-phase and reverse phase components of wheel speeds of left and right wheels for the front and rear wheels and calculates a pitch angular speed and a yaw angular speed of the sprung based on the in-phase and reverse phase components of the wheel speeds, respectively. The calculation unit (28) calculates in-phase and reverse phase components of vertical strokes of left and right suspensions for the front and rear wheels and calculates a vertical speed and a roll angular speed of the sprung based on the in-phase and reverse phase components of vertical strokes of the suspensions, respectively.

5 Claims, 10 Drawing Sheets

(56) References Cited

U.S. PATENT DOCUMENTS

| | | | |
|---|---|---|---|
| 2004/0024505 A1* | 2/2004 | Salib | B60G 17/0162 |
| | | | 701/38 |
| 2005/0236896 A1* | 10/2005 | Offerle | B60T 8/1755 |
| | | | 303/146 |
| 2008/0249689 A1* | 10/2008 | Matsumoto | B60T 8/173 |
| | | | 701/48 |
| 2010/0276896 A1* | 11/2010 | Sano | B60G 17/0152 |
| | | | 280/5.509 |
| 2011/0015844 A1* | 1/2011 | Perkins | B60T 8/17554 |
| | | | 701/69 |
| 2015/0183289 A1 | 7/2015 | Koumura | |
| 2015/0258975 A1 | 9/2015 | Koumura | |

FOREIGN PATENT DOCUMENTS

| | | |
|---|---|---|
| JP | 2004-175125 A | 6/2004 |
| JP | 2008-254538 A | 10/2008 |
| JP | 2015-123895 A | 7/2015 |
| JP | 2015-171845 A | 10/2015 |

\* cited by examiner

VEHICLE STATE ESTIMATION DEVICE

BACKGROUND OF THE INVENTION

1. Field of the Invention

The present invention relates to a vehicle state estimation device configured to estimate at least state quantities of at least a sprung of a vehicle.

2. Description of the Related Art

In a vehicle such as an automobile, state quantities of a sprung or unsprungs of a vehicle are sometimes estimated as parameters for executing vehicle control such as a vehicle running motion control and the like. For example, as described in Japanese Patent Application Laid-open Publication No. H6-48139, there is disclosed a suspension control device that is configured to estimate speeds of unsprungs relative to a sprung based on wheel speeds of wheels and driving operation input by a driver and to control damping forces of shock absorbers of the wheels.

In the suspension control device disclosed in the above Laid-open Publication, speeds of unsprungs relative to a sprung are estimated based on wheel speed of each wheel and driving operation input by a driver utilizing a vehicle model. In general, however, as characteristics of a vehicle changes in accordance with conditions such as driving operation input by a driver and the like, if actual characteristics shift from those of a vehicle model, accuracy in estimating speeds of unsprungs relative to a sprung lowers. It is not easy to correct a vehicle model successively in accordance with actual vehicle characteristics that change with driving operation input by a driver and the like.

SUMMARY OF THE INVENTION

A primary object of the present invention is to estimate state quantities of at least a sprung of a vehicle on the basis of wheel speeds of wheels without utilizing a vehicle model and correction thereof.

The present invention provides a vehicle state estimation device which is applied to a vehicle having front left and right wheels and rear left and right wheels and a sprung including vehicle body from which the wheels are suspended by suspensions that can expand and contract at least vertically, and comprises wheel speed detection devices that detect wheel speeds of the four wheels and a calculation unit that is configured to calculate state quantities o at least f the sprung on the basis of detected wheel speeds of the four wheels.

The calculation unit is configured to calculate an in-phase component of wheel speeds of left and right wheels and a reverse phase component of wheel speeds of left and right wheels for the front and rear wheels, and to calculate a pitch angular speed of the sprung and a yaw angular speed of the sprung on the basis of the in-phase component of wheel speeds of left and right wheels and the reverse phase component of wheel speeds of left and right wheels, respectively.

A sprung of a vehicle conducts pitching, rolling and yawing. The behavior which influences on components of wheel speeds that are in the same phase to the left and right wheels is pitching only and the behavior which influences on components of wheel speeds that are in the reverse phase to the left and right wheels is yawing only. Accordingly, a change rate of pitching behavior of the sprung, i.e., a pitch angular speed can be estimated on the basis of the components of wheel speeds that are in the same phase to the left and right wheels and a change rate of yawing behavior of the sprung, i.e., a yaw angular speed can be estimated on the basis of the components of wheel speeds that are in the reverse phase to the left and right wheels.

According to the above-mentioned configuration, an in-phase component of wheel speeds of left and right wheels and a reverse phase component of wheel speeds of left and right wheels for the front and rear wheels are calculated for wheel speeds of front and rear wheels. A pitch angular speed of the sprung and a yaw angular speed of the sprung are calculated on the basis of the in-phase component of wheel speeds of left and right wheels and the reverse phase component of wheel speeds of left and right wheels, respectively. Consequently, a pitch angular speed of the sprung and a yaw angular speed of the sprung can be calculated on the basis of wheel speeds of the four wheel without utilizing a vehicle model and correction thereof.

According to one embodiment of the present invention, the state estimation device acquires information of vertical strokes of the suspensions of the four wheels caused by expansions and contractions of the suspensions. The calculation unit is configured to calculate an in-phase component of vertical strokes of the left and right suspensions and a reverse phase component of vertical strokes of the left and right suspensions for the front and rear wheels, and to calculate a vertical speed of the sprung and a roll angular speed of the sprung on the basis of the in-phase component of vertical strokes of left and right suspensions and the reverse phase component of vertical strokes of left and right suspensions, respectively.

In-phase components of vertical strokes of left and right suspensions for the front and rear wheels correspond to a vertical displacement of the sprung. Reverse phase components of vertical strokes of left and right suspensions for the front and rear wheels correspond to a roll displacement of the sprung. Accordingly, a vertical speed of the sprung and a roll angular speed of the sprung can be calculated as change rates of the in-phase components of vertical strokes of left and right suspensions and the reverse phase components of vertical strokes of left and right suspensions for the front and rear wheels, respectively.

According to the above-mentioned configuration, an in-phase component of vertical strokes of the left and right suspensions and a reverse phase component of vertical strokes of the left and right suspensions are calculated for the front and rear wheels. A vertical speed of the sprung and a roll angular speed of the sprung are calculated on the basis of the in-phase component of vertical strokes of the left and right suspensions and the reverse phase component of vertical strokes of the left and right suspensions, respectively. Consequently, a vertical speed of the sprung and a roll angular speed of the sprung can be calculated on the basis of vertical strokes of the suspensions of the four wheels without utilizing a vehicle model and correction thereof.

Further, according to one embodiment of the present invention, the four wheels include tires. The calculation unit is configured, on the presupposition that a vertical transmitting force of each tire is the same as a vertical transmitting force of the associated suspension, to calculate an in-phase component of vertical strokes of left and right suspensions and a reverse phase component of vertical strokes of left and right suspensions for the front and rear wheels on the basis of wheel speeds of the four wheels, and to calculate a vertical speed of the sprung and a roll angular speed of the sprung on the basis of the in-phase component of vertical strokes of left and right suspensions and the reverse phase component of vertical strokes of left and right suspensions, respectively.

As will be described in detail later, if it is assumed that a vertical transmitting force of a tire is the same as a vertical transmitting force of an associated suspension, an in-phase component of vertical strokes of left and right suspensions and a reverse phase component of vertical strokes of left and right suspensions for the front and rear wheels can be calculated on the basis of wheel speeds of the four wheels. When vertical stroke speed of a suspension of each wheel becomes high, a direction of a force acting between the sprung and an unsprung conforms to that of relative displacement between them. Thus, an error due to the assumption is small in calculating an in-phase component of vertical strokes of left and right suspensions and a reverse phase component of vertical strokes of left and right suspensions.

According to the above-mentioned configuration, on the presupposition that a vertical transmitting force of each tire is the same as a vertical transmitting force of the associated suspension, an in-phase component of vertical strokes of left and right suspensions and a reverse phase component of vertical strokes of left and right suspensions for the front and rear wheels are calculated on the basis of wheel speeds of the four wheels. In addition, a vertical speed of the sprung and a roll angular speed of the sprung are calculated on the basis of the in-phase component of vertical strokes of left and right suspensions and the reverse phase component of vertical strokes of left and right suspensions, respectively. Consequently, a vertical speed of the sprung and a roll angular speed of the sprung can be calculated on the basis of wheel speeds of the four wheels without requiring information of vertical strokes of the suspensions of the four wheels caused by expansions and contractions of the suspensions and without utilizing a vehicle model and correction thereof.

Further, according to one embodiment of the present invention, the calculation unit is configured to calculate an in-phase component of vertical speeds of unsprungs of the front left and right wheels on the basis of the pitch angular speed of the sprung and the in-phase component of vertical strokes of left and right suspensions for the front and rear wheels, to calculate a reverse phase component of vertical speeds of the unsprungs of the front left and right wheels on the basis of the reverse phase component of vertical strokes of left and right suspensions for the front and rear wheels, to calculate vertical speeds of unsprungs of the front left and right wheels on the basis of the in-phase component of vertical speeds of the unsprungs of the front left and right wheels and the reverse phase component of vertical speeds of the unsprungs of the front left and right wheels, and to calculate vertical speeds of the unsprungs of the rear left and right wheels on the basis of a delay time that is a wheel base of the vehicle divided by a vehicle speed and the vertical speeds of the unsprungs of the front left and right wheels.

According to the above-mentioned configuration, an in-phase component of vertical speeds of unsprungs of the front left and right wheels is calculated on the basis of the pitch angular speed of the sprung and the in-phase component of vertical strokes of left and right suspensions for the front and rear wheels. A reverse phase component of vertical speeds of the unsprungs of the front left and right wheels is calculated on the basis of the reverse phase component of vertical strokes of left and right suspensions for the front and rear wheels. If an in-phase component of vertical speeds of unsprungs of the front left and right wheels and a reverse phase component of vertical speeds of unsprungs of the front left and right wheels are calculated, on the basis of these values, vertical speeds of the unsprungs of the front left and right wheels can be calculated. Vertical speeds of the unsprungs of the rear left and right wheels change as delayed with the above-mentioned delay time relative to vertical speeds of the unsprungs of the front left and right wheels, respectively. Thus, vertical speeds of the unsprungs of the rear left and right wheels can be calculated on the basis of the delay time and vertical speeds of unsprungs of the front left and right wheels, respectively. Consequently, according to the above-mentioned configuration, vertical speeds of the unsprungs of the front left and right wheels and the rear left and right wheels can be calculated without utilizing a vehicle model and correction thereof.

Further, according to one embodiment of the present invention, the calculation unit is configured to calculate vertical displacements of a road surface at positions of the front left and right wheels on the basis of the in-phase component of vertical speeds of the unsprungs of the front left and right wheels and the reverse phase component of vertical speeds of the unsprungs of the front left and right wheels, and to calculate vertical displacements of the road surface at positions of the rear left and right wheels on the basis of the delay time and the vertical displacements of the road surface at positions of the front left and right wheels, respectively.

A vertical speed of a road surface at a position of each wheel corresponds to a vertical speed of a unsprung of an associated wheel. On the basis of the in-phase component of vertical speeds of the unsprungs of the front wheels and the reverse phase component of vertical speeds of the unsprungs of the front wheels, vertical speeds of the unsprungs of the front left and right wheels can be calculated and, accordingly, vertical speeds of a road surface at positions of the front left and right wheels can be calculated, which enables to calculate vertical displacements of a road surface at positions of the front left and right wheels. In addition, when a vehicle runs, vertical displacements of a road surface at positions of the rear left and right wheels change as delayed with the above-mentioned delay time relative to vertical displacements of the road surface at the positions of the front left and right wheels, respectively. Thus, vertical displacements of a road surface at the positions of the rear left and right wheels can be calculated on the basis of the delay time and vertical displacements of the road surface at the positions of the front left and right wheels, respectively. Consequently, according to the above-mentioned configuration, vertical displacements of a road surface at positions of the front left and right wheels and the rear left and right wheels can be calculated without utilizing a vehicle model and correction thereof.

It is to be noted that in the present patent application, with respect to parameters, "in-phase component of the left and right wheels", "in-phase component" and the like mean a component which is included in and common to parameters of the left and right wheels. For example, denoting parameters for the left and right wheels by PL and PR, "in-phase component of the left and right wheels" or "in-phase component" is $(PL+PR)/2$. On the contrary, with respect to parameters, "reverse phase component of the left and right wheels", "reverse phase component" and the like mean a component which is included in but is not common to parameters of the left and right wheels. For example, "reverse phase component of the left and right wheels" or "reverse phase component" is $(-PL+PR)/2$ or $(PL-PR)/2$.

DETAILED DESCRIPTION OF THE PREFERRED EMBODIMENTS

Now, with reference to the accompanying drawings, preferred embodiments of the present invention are described in detail.

First Embodiment

Figure 1:
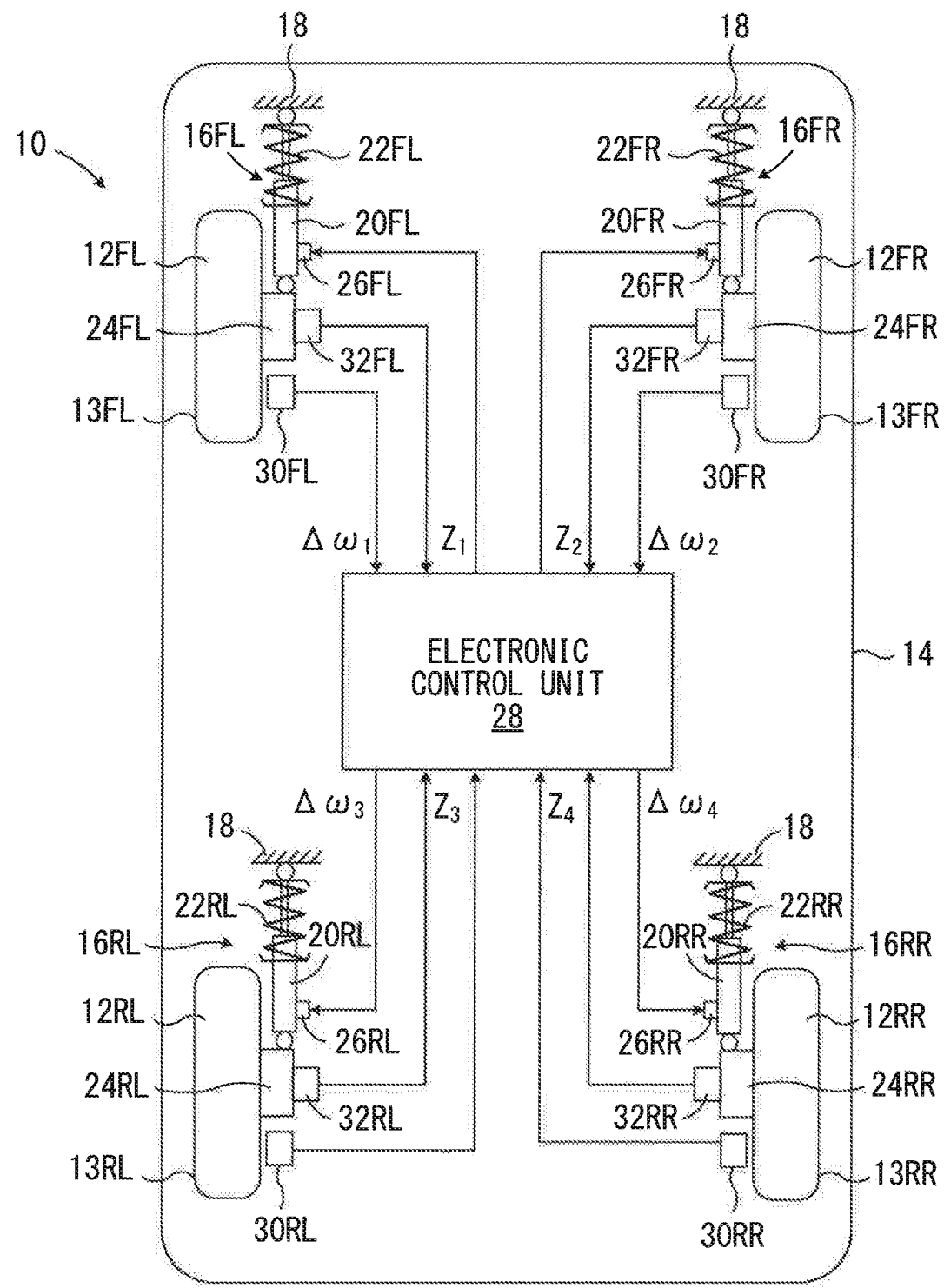
FIG. 1 is a schematic view for illustrating a vehicle state estimation device according to a first embodiment of the present invention.

FIG. 1 is a schematic view for illustrating a vehicle state estimation device 10 according to a first embodiment of the present invention.

As shown in FIG. 1, the vehicle state estimation device 10 is applied to a vehicle 14 which has front left and right wheels 12FL and 12FR that are steered wheels and rear left and right wheels 12RL and 12RR that are non-steered wheels. Although not shown in detail in FIG. 1, the front wheels 12FL and 12FR have tires 13FL and 13FR, respectively, mounted around metal wheel members, and the rear wheels 12RL and 12RR have tires 13 RL and 13RR, respectively, mounted around metal wheel members. The front wheels 12FL and 12FR are suspended by suspensions 16FL and 16FR, respectively, from a vehicle body 18 and the rear wheels 12RL and 12RR are suspended by suspensions 16 RL and 18RR, respectively, from the vehicle body 18.

The suspensions 16FL-16RR include shock absorbers 20FL-20RR and suspension springs 22FL-22RR, respectively. The shock absorbers 20FL-20RR and the suspension springs 22FL-22RR extend vertically slightly inclined in longitudinal and lateral directions of the vehicle 14. The wheels 12FL-12RR are rotatably supported by wheel carriers 24FL-24RR, respectively, which are coupled to the vehicle body 18 by suspension arms, not shown, so as to displace mainly in vertical direction. The shock absorbers 20FL-20RR are arranged between the vehicle body 18 and the wheel carriers 24FL-24RR or the suspension arms, respectively.

The vehicle body 18 can displace at least vertically relative to the wheels 12FL-12RR by means of expansion and contraction of the shock absorbers 20FL-20RR and the suspension springs 22FL-22RR. Thus, the vehicle body 18, portions of the shock absorbers 20FL-20RR and portions of the suspension arms and the like form a sprung of the vehicle 14. The wheels 12FL-12RR, the wheel carriers 24FL-24RR, the other portions of the shock absorbers 20FL-20RR and the other portions of the suspension arms and the like form unsprungs of the vehicle 14.

The suspension springs 22FL-22RR restrict vertical displacement of a road surface and shocks and the like that the wheels 12FL-12RR receive from the road surface from being transmitted to the sprung. The shock absorbers 20FL-20RR generate damping forces that damp vibrations caused by relative displacement of the sprung and the unsprungs. In the first embodiment, the shock absorbers 20FL-20RR are damping force variable shock absorbers having actuators 26FL-26RR, respectively. The actuators 26FL-26RR variably control damping forces of the shock absorbers 20FL-20RR, respectively, in multistage or continually between the lowest damping force and the highest damping force by controlling openings of damping force generation valves incorporated in the shock absorbers 20FL-20RR.

The actuators 26FL-26RR are controlled by an electronic control unit 28 that serves as calculation unit. The wheels 12FL-12RR are provided with wheel speed sensors 30FL-30RR that detect wheel speeds $\Delta\omega_1$-$\Delta\omega_4$ of the associated wheels, respectively. The wheel speed sensors 30FL-30RR detect as wheel speeds $\Delta\omega_1$-$\Delta\omega_4$ rotational speed of the wheels 12FL-12RR relative to the sprung, respectively. The suspensions 16FL-16RR are provided with stroke sensors 32FL-32RR that detect vertical strokes $Z_1$-$Z_4$ of the associated suspensions 16FL-16RR, respectively. Signals indicative of the detected wheel speeds $\Delta\omega_1$-$\Delta\omega_4$ and vertical strokes $Z_1$-$Z_4$ are input into the electronic control unit 28.

It is to be noted that suffixes 1-4 which are attached to wheel speeds $\Delta\omega$, strokes and below-described other parameters represent that they are parameters of the front left, front right, rear left and rear right wheels, respectively, as FL, FR, RL and RR do. Suffixes F and R which are fixed to the parameters represent that they are parameters of the front and rear wheels, respectively. When the members and the parameters of the front left, front right, rear left and rear right wheels are totally referred to, the suffixes are omitted such as, for example, the wheels 12 and wheel speeds $\Delta\omega$.

In the first embodiment, as described later in detail, the electronic control unit 28 estimates various state quantities of the sprung such as, for example, vertical speed, pitch angular speed, roll angular speed and yaw angular speed of the sprung on the basis of wheel speeds $\Delta\omega_1$-$\Delta\omega_4$ and vertical strokes $Z_1$-$Z_4$. In addition, the electronic control unit 28 estimates vertical speeds of the wheels 12FL-12RR as state quantities of the unsprungs on the basis of wheel speeds $\Delta\omega_1$-$\Delta\omega_4$ and vertical strokes $Z_1$-$Z_4$.

The electronic control unit 28 controls the actuators 26FL-26RR in accordance with the estimated state quantities of the vehicle 14 so as to control the damping forces of the associated shock absorbers 20FL-20RR so that operation stability and ride comfort of the vehicle 14 are enhanced.

Notably, a control executed in accordance with the estimated state quantities of the vehicle 14 is not limited to the damping force control but may be any other control of the vehicle 14 such as a running motion control for a vehicle.

Although not illustrated in detail in FIG. 1, the electronic control unit 28 has a microcomputer and a drive circuit. The microcomputer may have a general configuration having CPU, ROM, RAM and an input/output port connected with one another via a bidirectional common bus. ROM stores a control program corresponding to a block diagram shown in FIG. 2 and CPU executes the program.

"Summary of State Quantities Estimation"

Next, a summary of estimation of state quantities of the sprung and the unsprungs in the first embodiment will be described. As described in detail later, in the first embodiment, various state quantities of the sprung are estimated in the following manner and vertical speeds of the unsprungs are additionally estimated for the wheels.

It is to be noted that in the following description, positive directions of the various parameters and their changes are forward, upward and leftward. In addition, it is assumed that the tires 13FL-13RR, the suspensions 16FL-16RR and the like of the left and right wheels have the same characteristics with each other.

1. Wheel speeds $\Delta\omega_1$-$\Delta\omega_4$ of the wheels 12FL-12RR and vertical strokes $Z_1$-$Z_4$ of the suspensions 16FL-16RR are detected.

2. Behaviors of the sprung include pitching, rolling and yawing. The behavior which influences on components of wheel speeds $\Delta\omega_1$-$\Delta\omega_4$ that are in the same phase to the left and right wheels is pitching only and the behavior which influences on components of wheel speeds $\Delta\omega_e$-$\Delta\omega_4$ that are in the reverse phase to the left and right wheels is yawing only. Accordingly, a pitch angular speed of the sprung is estimated on the basis of the components of wheel speeds $\Delta\omega_1$-$\Delta\omega_4$ that are in the same phase to the left and right wheels and a yaw angular speed of the sprung is estimated on the basis of the components of wheel speeds $\Delta\omega_1$-$\Delta\omega_4$ that are in the reverse phase to the left and right wheels.

3. Components of vertical stroke speeds of the front and rear suspensions 16 which are in the same phase to the left and right wheels and components of vertical stroke speeds of the front and rear suspensions 16 which are in the reverse phase to the left and right wheels are estimated on the basis of the vertical strokes $Z_1$-$Z_4$.

4. A vertical speed of the sprung is estimated on the basis of the pitch angular speed of the sprung and the component of vertical stroke speeds of the front suspensions 16 which are in the same phase to the left and right wheels, and a roll angular speed of the sprung is estimated on the basis of the components of vertical stroke speeds of the front and rear suspensions 16 which are in the reverse phase to the left and right wheels.

5. The unsprungs of the rear wheels make the same displacements as the unsprungs of the front wheels with a delay time L/U that is the wheel base L of the vehicle divided by a vehicle speed U. Accordingly, a component of vertical speeds of the unsprungs of the front wheels which are in the same phase to the left and right wheels is estimated on the basis of the pitch angular speed of the sprung and the component of vertical stroke speeds of the rear suspensions 16 which are in the same phase to the left and right wheels. In addition, a component of vertical speeds of the unsprungs of the front wheels which are in the reverse phase to the left and right wheels is estimated on the basis of the components of vertical stroke speeds of the front and rear suspensions 16 which are in the reverse phase to the left and right wheels.

6. Vertical speeds of the unsprungs of the front wheels 12FL and 12FR are estimated on the basis of the component of vertical speeds of the unsprungs of the front wheels which are in the same phase to the left and right wheels and the component of vertical speeds of the unsprungs of the front wheels which are in the reverse phase to the left and right wheels.

7. Vertical speeds of the unsprungs of the rear wheels 12RL and 12RR are estimated on the basis of the vertical speeds of the unsprungs of the front wheels 12FL and 12FR and the delay time L/U.

"Theoretical Formulae of State Quantities Estimation"

Next, theoretical formulae will be described with which estimations of state quantities of the sprung and the unsprungs executed in the above-described manners are based. It is to be noted that in the following descriptions, differential values and second order differential values of parameters in formulae are written as parameters having a dot (.) that indicates a differential value and two dots (..) that indicates a second order differential value. In the following explanatory descriptions, however, since a dot and two dots cannot be written, differential values and second order differential values of parameters are written as parameters having a foregoing "d" that means a differential value and a foregoing "dd" that means a second order differential value.

Figure 4:
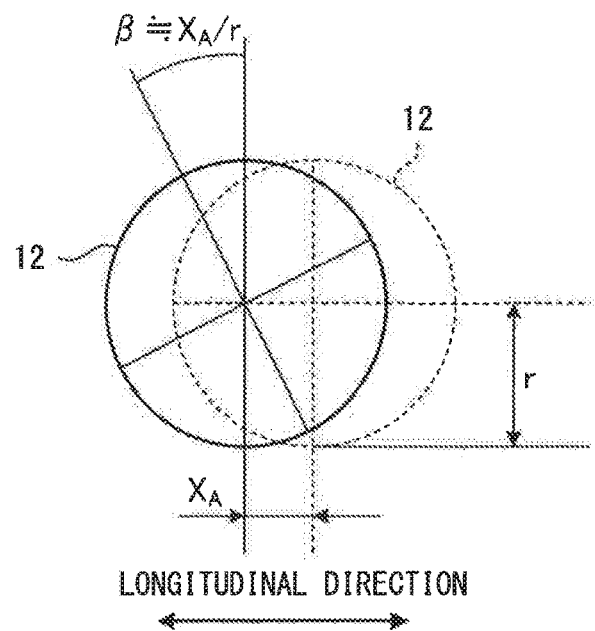
FIG. 4 illustrates a change in rotation angle of a tire caused by a change in longitudinal displacement of an unsprung.

FIG. 4 illustrates a change in rotation angle of a tire 13 caused by a change in longitudinal displacement of an unsprung. In FIG. 4, a dot line indicates a position of the tire 13 in a situation where it is not influenced by an input from a road surface to a wheel and driving operation by a driver, and a solid line indicates a position of the tire 13 in a situation where it is subjected to the above influences. Denoting a change amount in longitudinal displacement of the unsprung by $X_A$ and a radius of the tire 13 by r, a rotation angle $\beta$ of the tire 13 can be approximated by $X_A/r$.

If the radius of the tire 13 changes due to deformation of the tire, a change in rotation angle of the tire 13 can be caused by the change in the radius. A change amount in the radius of the tire 13 due to its deformation is represented by $\Delta r$; a ratio of a change amount in the radius of the tire 13 due to dynamic load to a change amount in the radius due to static load is represented by $\eta$; and a rotational speed in a situation where the change amount $\Delta r$ in the radius is 0 is represented by $\omega_0$. Then, a change amount in the radius of the tire 13 in a situation where the radius r of the tire 13 changes by $\Delta r$ is represented by $\eta*\omega_0(\Delta r/r)$. As a rotational speed of the tire 13 is a differential value of a rotation angle $\beta$, a rotational speed $\omega$ of the tire 13 in a situation where a change amount in the radius r of the tire 13 due to its deformation is $\Delta r$ is represented by the following Formula (1.)

$$\omega = \dot{X}_A/r - \eta\omega_0\frac{\Delta r}{r} \tag{1}$$

The Formula (1) can be transformed into the following Formula (2.) Notably, $dX_A$ is a differential value of a longitudinal displacement $X_A$ of the unsprung and $dX_B$ is a differential value of a longitudinal displacement $X_B$ of the sprung at axle position TC (see FIG. 5.) The axle position TC is on a center line of the wheel 12 and a center point of the wheel 12 in its lateral direction. In addition, $Z_A$ is a vertical displacement of the unsprung and $Z_0$ is a vertical displacement of the unsprung in a situation where it is not influenced by an input from a road surface to the wheel and driving operation by a driver $$\omega=[\dot{X}_B+(\dot{X}_A-\dot{X}_B)-\eta\omega_0(Z_A-Z_0)]/r \quad (2)$$

The first term $dX_B$ in the bracket on the right side of the above Formula (2) will be described. The first term is that of differential value of a longitudinal displacement of the axle position TC due to a behavior of the sprung. A longitudinal displacement $X_B$ of the axle position TC due to a behavior of the sprung is represented by a total of a longitudinal displacement due to longitudinal movement of the sprung illustrated in FIG. 5, a longitudinal displacement due to pitching of the sprung illustrated in FIG. 6 and a longitudinal displacement due to yawing of the sprung illustrated in FIG. 7.

Figure 5:
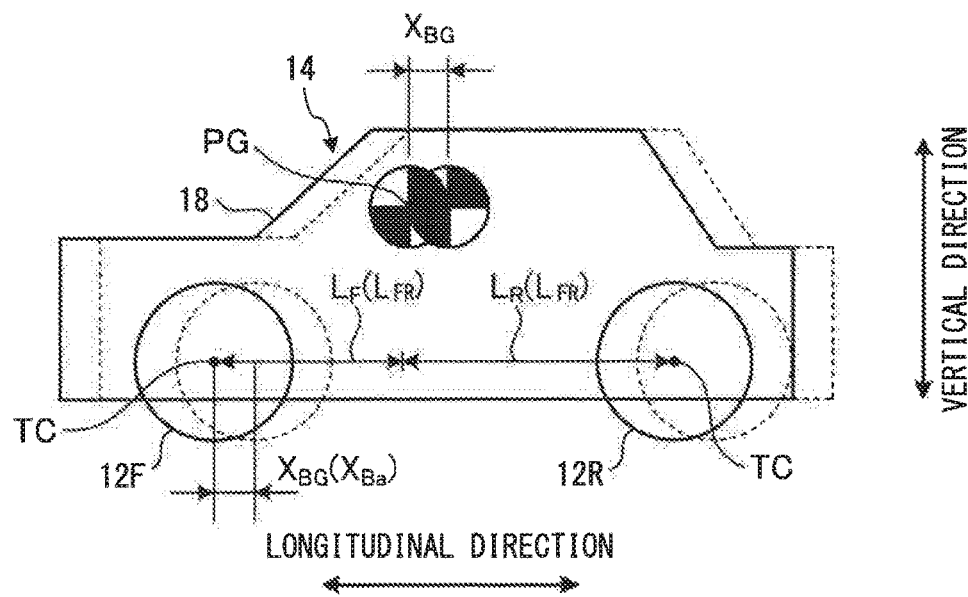
FIG. 5 illustrates a situation where the position of the sprung changes in a longitudinal direction of the vehicle.

As illustrated in FIG. 5, when the position of the sprung changes in a longitudinal direction of the vehicle, a longitudinal displacement $X_B$ of the sprung at axle position TC includes a component $X_{Ba}$ generated by a change in the position of the sprung in the longitudinal direction of the vehicle 14. Denoting a longitudinal displacement of the sprung at a gravity center PG by $X_{BG}$, as represented by the following Formula (3), the longitudinal displacement $X_{Ba}$ due to a longitudinal movement of the sprung is the same as the change amount $X_{BG}$.

$$X_{Ba}=X_{BG} \quad (3)$$

Figure 6:
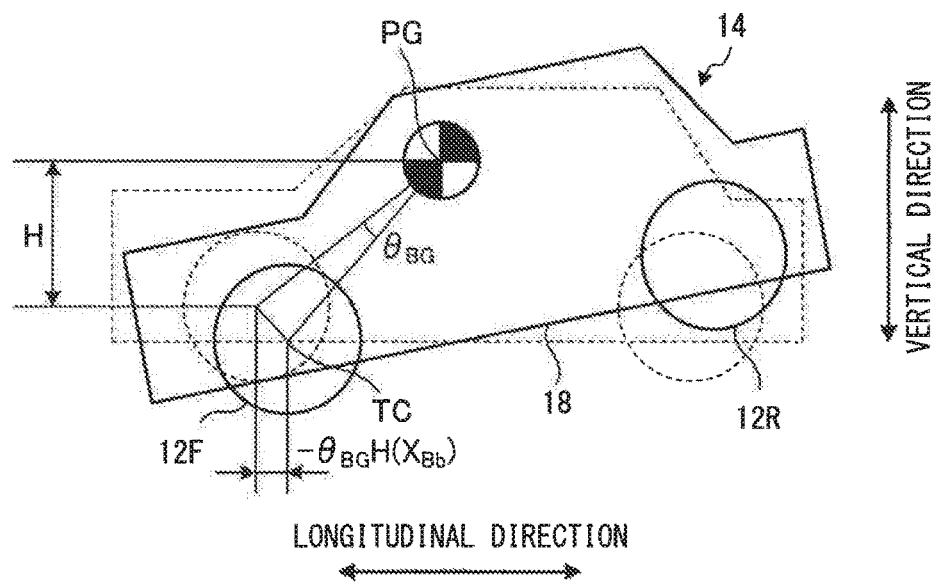
FIG. 6 illustrates a situation where pitching of the vehicle occurs.

As illustrated in FIG. 6, when pitching of the vehicle 14 occurs, a longitudinal displacement $X_B$ of the sprung at the axle position TC includes a component $X_{Bb}$ generated by the pitching. Denoting a pitch angle of the sprung by $\theta_{BG}$ and denoting a vertical distance between the axle position TC and the gravity center PG by H, a longitudinal displacement $X_{Bb}$ of the sprung due to pitching is represented by the following Formula (4.)

$$X_{Bb}=-\theta_{BG}*H \quad (4)$$

Figure 7:
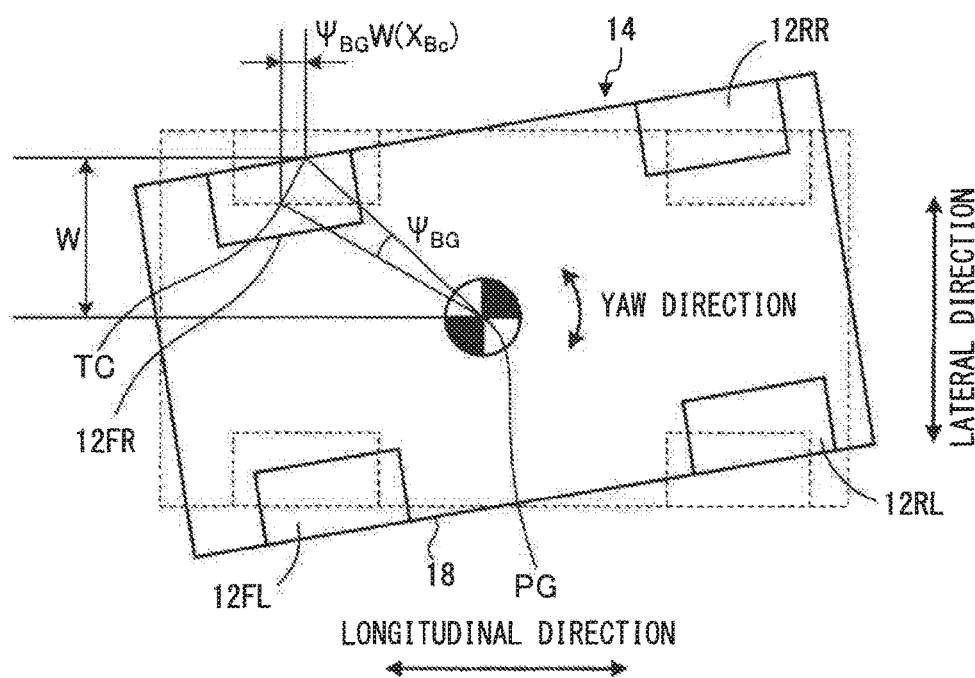
FIG. 7 illustrates a situation where yawing of the vehicle occurs.

As illustrated in FIG. 7, when yawing of the vehicle 14 occurs, a longitudinal displacement $X_B$ of the sprung at the axle position TC includes a component $X_{Bc}$ generated by the yawing. Denoting a yaw angle of the sprung by $\psi_{BG}$ and denoting a lateral distance between the gravity center PG and the axle position TC by W, a longitudinal displacement $X_{Bc}$ of the sprung due to yawing is represented by the following Formula (5.)

$$X_{Bc}=\psi_{BG}*W \quad (5)$$

A longitudinal displacement $X_B$ of the sprung at the axle position TC due to behaviors of the sprung is a total of the above three components $X_{Ba}$, $X_{Bb}$ and $X_{Bc}$. Thus, a differential value $dX_B$ of the longitudinal displacement is represented by the following Formula (6.)

$$dX_B=-d\theta_{BG}*H+dX_{BG}+d\psi_{BG}*W \quad (6)$$

Figure 8:
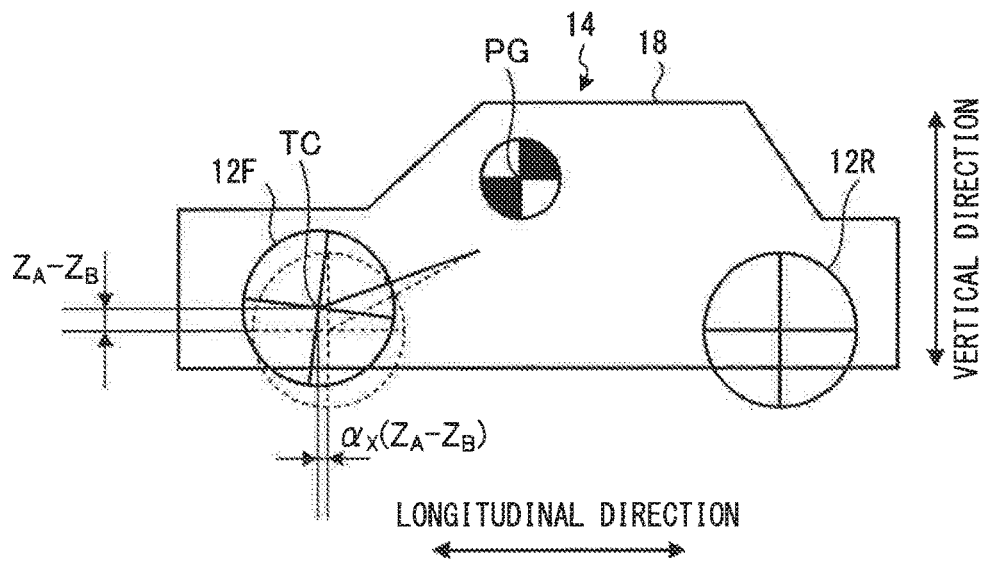
FIG. 8 illustrates a situation where a front wheel is displaced vertically by a vertical stroke of a suspension.

Next, the second term $(dX_A-dX_B)$ in the bracket on the right side of the above Formula (2) will be described. The second term is that of differential value of a longitudinal displacement of the axle position TC due to a relative vertical displacement of the sprung and the unsprung, i.e., a vertical stroke of the suspension 16. As illustrated in FIG. 8 with respect to the front wheel 12F, the vehicle body 18 which forms a part of the sprung and the front wheel 12F displaces vertically by a vertical stroke of the suspension 16. As described above, since the suspension 16 is inclined relative to the vertical direction in the longitudinal direction of the vehicle 14, the wheel 12 and the vehicle body 18 displaces as well in the longitudinal direction of the vehicle.

A difference $(dX_A-dX_B)$ between differential values of longitudinal displacements of the sprung and the unsprung is represented by the following Formula (7.)

$$dX_A-dX_B=\alpha_X(dZ_A-dZ_B) \quad (7)$$

Here, $dZ_A$ is a vertical speed of the sprung; $dZ_B$ is a vertical speed of the unsprung at the axle position TC; and $\alpha_X$ is a relative displacement of the sprung and the unsprung in the longitudinal direction of the vehicle 14 per a unit stroke amount of the suspension 16.

In addition, the third term $\eta*\omega_0(Z_A-Z_0)$ in the bracket on the right side of the above Formula (2) will be described. $\Delta r$ in the second term on the right side of the above Formula (1), i.e., a change amount in the radius r of the tire 13 due to its deformation is equal to a difference between a vertical displacement $Z_A$ of the unsprung and a vertical displacement $Z_0$ of the unsprung in a situation where a change amount $\Delta r$ in the radius r of the tire 13 is 0. Thus, the following Formula (8) holds.

$$\Delta r=Z_A-Z_0 \quad (8)$$

According to the above Formulae (6)-(8), the above Formula (2) can be transformed into the following Formula (9.)

$$\omega=[(-\dot{\theta}_{BG}H+\dot{X}_{BG}+\dot{\psi}W)+\alpha_X(\dot{Z}_A-\dot{Z}_B)-\eta\omega_0(Z_A-Z_0)]/r \quad (9)$$

Next, referring to FIGS. 9 and 10, a pitch angle $\theta_A$ of the unsprung will be described. A pitch angle $\theta_A$ of the unsprung is an inclined angle of the unsprung relative to a road surface in the longitudinal direction of the vehicle 14. In the vehicle 14, as the suspension 16 expands and contracts, there arises a case where a pitch angle $\theta_{BG}$ of the sprung and a pitch angle $\theta_A$ of the unsprung differ from each other. In other words, a pitch angle $\theta_A$ of the unsprung includes a component $\theta_{Aa}$ that corresponds to a pitch angle $\theta_{BG}$ of the sprung and a component $\theta_{Ab}$ generated by expansion and contraction of the suspension 16.

Figure 9:
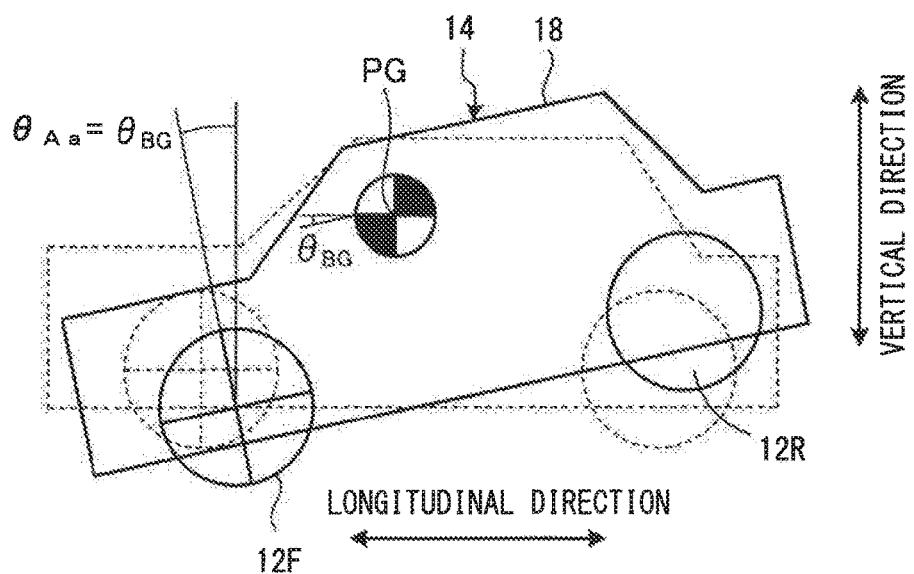
FIG. 9 illustrates a situation where a pitch angle of an unsprung is generated by pitching of the vehicle.

As illustrated in FIG. 9, a component $\theta_{Aa}$ that corresponds to a pitch angle $\theta_{BG}$ of the sprung is equal to a pitch angle $\theta_{BG}$ of the sprung. Thus, a component $\theta_{Aa}$ that corresponds to a pitch angle $\theta_{BG}$ of the sprung is represented by the following Formula (10.)

$$\theta_{Aa}=\theta_{BG} \quad (10)$$

Figure 10:
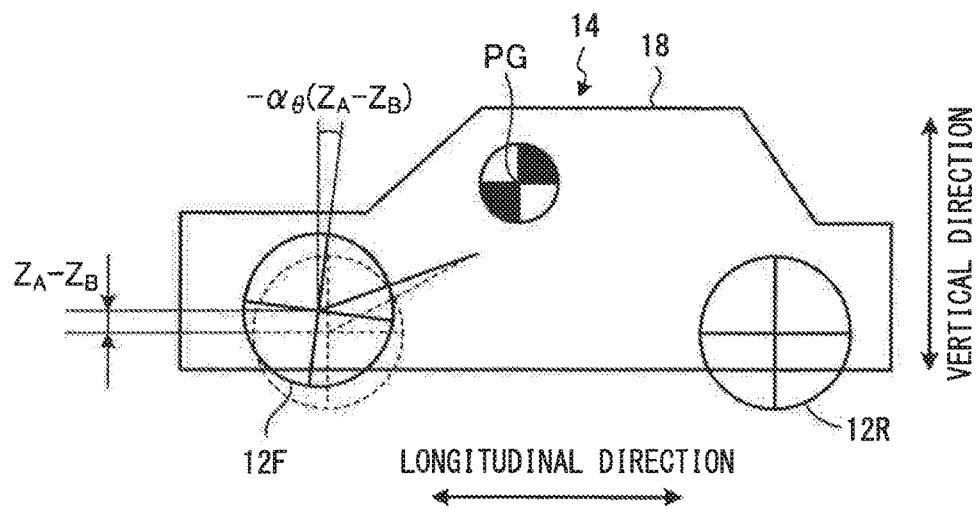
FIG. 10 illustrates a situation where the suspension of the front wheel expands and contracts due to input from a road surface but the suspension of the rear wheel does not expand nor contract.

FIG. 10 illustrates a situation where the suspension 16 of the front wheel 12F of the vehicle 14 expands and contracts due to input from a road surface and the like, but the suspension 16 of the rear wheel 12R does not expand nor contract. Denoting a pitch angle of the unsprung per a unit stroke amount of the suspension 16 by $\alpha_\theta$, as illustrated in FIG. 10, a component $\theta_{Ab}$ of a pitch angle $\theta_A$ generated by expansion and contraction of the suspension 16 is represented by the following Formula (11.)

$$\theta_{Ab}=-\alpha_e(Z_A-Z_B) \quad (11)$$

A rotational speed caused by a change in a pitch angle $\theta_A$ of the unsprung, i.e., a differential value of a pitch angle $\theta_A$ of the unsprung is represented by the following Formula (12.)

$$\dot{\theta}_A=\dot{\theta}_{BG}+\alpha_e(\dot{Z}_A-\dot{Z}_B) \quad (12)$$

Next, a wheel speed $\Delta\omega$ will be described. Each wheel speed $\Delta\omega$ is a value detected by an associated wheel speed sensor 30. As described above, the wheel speed sensor 30 detects a rotational speed of the unsprung relative to the sprung as a wheel speed $\Delta\omega$. Thus, a wheel speed $\Delta\omega$ is a difference between a rotational speed $\omega$ of the tire 13 and a rotational speed caused by a change in a pitch angle $\theta_A$ of the unsprung, and, accordingly, the following Formula (13) holds.

$$\Delta\omega = \omega - \theta_A \quad (13)$$

The following Formula (14) is derived by substituting the above Formulae (9) and (12) for the above Formula (13.)

$$\Delta\omega = [(-\dot{\theta}_{BG}H + \dot{X}_{BG} + \dot{\psi}W) + \alpha_X(\dot{Z}_A - \dot{Z}_B) - \eta\psi_0(Z_A - Z_0)] / r - [\dot{\theta}_{BG} + \alpha_\theta(\dot{Z}_A - \dot{Z}_B)] \quad (14)$$

Next, a vertical displacement of the sprung will be described. A vertical displacement $X_B$ of the sprung at the axle position TC can be expressed with the following Formula (15.) The first term on the right side of the following Formula (15) is a vertical displacement of the axle position TC. The second term on the right side of the following Formula (15) is a vertical displacement (an approximated value) caused by pitching of the sprung. The third term on the right side of the following Formula (15) is a vertical displacement (an approximated value) caused by rolling of the sprung.

$$Z_B = Z_{BG} \pm L_{FR}*\theta_{BG} \pm W*\varphi_{BG} \quad (15)$$

In the above Formula (15), $L_{FR}$ is a distance between the axle position TC and the gravity center position PG in the longitudinal direction of the vehicle (see FIG. 5), and $\varphi_{BG}$ is a roll angle of the sprung. A distance $L_{FR}$ between the axle position TC and the gravity center position PG in the longitudinal direction is a distance $L_F$ in the case of the front wheel 12FR or 12FL and a distance $L_R$ in the case of the rear wheel 12RR or 12 RL. The distances $L_F$ and $L_R$ may take different values.

Describing the Formula (15) with regard to the front left wheel 12FL, for example, a vertical displacement $Z_{B1}$ of the sprung at the axle position TC of the front left wheel 12FL can be obtained by adding or subtracting a vertical displacement caused by pitching of the sprung and a vertical displacement caused by rolling of the sprung to or from a vertical displacement $Z_{BG}$ of the gravity center position PG. For example, when the sprung is pitched such that the front wheel side sinks in, a vertical displacement ($L_{FR}*\theta_{BG}$) caused by pitching of the sprung is subtracted from a vertical displacement $Z_{BG}$ of the gravity center position PG. When the sprung is rolled such that the left side of the vehicle sinks in, a vertical displacement ($W_{BG}*\varphi_{BG}$) caused by rolling of the sprung is subtracted from a vertical displacement $Z_{BG}$ of the gravity center position PG.

On the contrary, when the sprung is pitched such that the front wheel side lifts up, a vertical displacement ($L_{FR}*\theta_{BG}$) caused by pitching of the sprung is added to a vertical displacement $Z_{BG}$ of the gravity center position PG. When the sprung is rolled such that the left side of the vehicle lifts up, a vertical displacement ($W_{BG}*\varphi_{BG}$) caused by rolling of the sprung is added. With respect to each of the other wheels 12FL, 12RR and 12 RL as well, a vertical displacement $Z_B$ of the sprung at the axle position TC is similarly calculated.

According to the above Formula (15), a change speed $dZ_B$ of a vertical displacement of the sprung at the axle position TC is expressed with the following Formula (16.)

$$\dot{Z}_B = \dot{Z}_{BG} \mp L_{FR}\dot{\theta}_{BG} \mp W\dot{\varphi}_{BG} \quad (16)$$

Applying the above Formula (14) to the four wheels, and notating the wheel speeds $\Delta\omega$ for the four wheels in a matrix form, the following Formula (17) is obtained. Notably, in the following Formula (17), the matrixes [D], [G], [E], [F] and [H] are indicated in the following Formulae (18)-(22), respectively.

$$\begin{pmatrix}\Delta\omega_1\\\Delta\omega_2\\\Delta\omega_3\\\Delta\omega_4\end{pmatrix} = \begin{pmatrix}\omega_1 - \theta_{A1}S\\\omega_2 - \theta_{A2}S\\\omega_3 - \theta_{A3}S\\\omega_4 - \theta_{A4}S\end{pmatrix} = D\begin{pmatrix}\dot{Z}_{BG}\\\dot{\theta}_{BG}\\\dot{X}_{BG}\\\dot{Y}_{BG}\\\dot{\varphi}_{BG}\\\dot{\psi}_{BG}\end{pmatrix} - G\begin{pmatrix}\dot{Z}_{BG}\\\dot{\theta}_{BG}\\\dot{X}_{BG}\\\dot{Y}_{BG}\\\dot{\varphi}_{BG}\\\dot{\psi}_{BG}\end{pmatrix} + \quad (17)$$

$$E\begin{pmatrix}\dot{Z}_{A1}-\dot{Z}_{B1}\\\dot{Z}_{A2}-\dot{Z}_{B2}\\\dot{Z}_{A3}-\dot{Z}_{B3}\\\dot{Z}_{A4}-\dot{Z}_{B4}\end{pmatrix} - F\begin{pmatrix}\dot{Z}_{A1}-\dot{Z}_{B1}\\\dot{Z}_{A2}-\dot{Z}_{B2}\\\dot{Z}_{A3}-\dot{Z}_{B3}\\\dot{Z}_{A4}-\dot{Z}_{B4}\end{pmatrix} - H\begin{pmatrix}Z_{A1}-Z_{01}\\Z_{A2}-Z_{02}\\Z_{A3}-Z_{03}\\Z_{A4}-Z_{04}\end{pmatrix} =$$

$$(D-G)\begin{pmatrix}\dot{Z}_{BG}\\\dot{\theta}_{BG}\\\dot{X}_{BG}\\\dot{Y}_{BG}\\\dot{\varphi}_{BG}\\\dot{\psi}_{BG}\end{pmatrix} + (E-F)\begin{pmatrix}\dot{Z}_{A1}-\dot{Z}_{B1}\\\dot{Z}_{A2}-\dot{Z}_{B2}\\\dot{Z}_{A3}-\dot{Z}_{B3}\\\dot{Z}_{A4}-\dot{Z}_{B4}\end{pmatrix} + H\begin{pmatrix}Z_{01}-Z_{A1}\\Z_{02}-Z_{A2}\\Z_{03}-Z_{A3}\\Z_{04}-Z_{A4}\end{pmatrix}$$

$$[D] = \begin{pmatrix}0 & -H_F/r_F & 1/r_F & 0 & 0 & W_F/r_F\\0 & -H_F/r_F & 1/r_F & 0 & 0 & -W_F/r_F\\0 & -H_R/r_R & 1/r_R & 0 & 0 & W_R/r_R\\0 & -H_R/r_R & 1/r_R & 0 & 0 & -W_R/r_R\end{pmatrix} \quad (18)$$

$$[G] = \begin{pmatrix}0 & 1 & 0 & 0 & 0 & 0\\0 & 1 & 0 & 0 & 0 & 0\\0 & 1 & 0 & 0 & 0 & 0\\0 & 1 & 0 & 0 & 0 & 0\end{pmatrix} \quad (19)$$

$$[E] = \begin{pmatrix}\alpha_{XF}/r_F & 0 & 0 & 0\\0 & \alpha_{XF}/r_F & 0 & 0\\0 & 0 & \alpha_{XR}/r_R & 0\\0 & 0 & 0 & \alpha_{XR}/r_R\end{pmatrix} \quad (20)$$

$$[F] = \begin{pmatrix}\alpha_{\theta F} & 0 & 0 & 0\\0 & \alpha_{\theta F} & 0 & 0\\0 & 0 & \alpha_{\theta R} & 0\\0 & 0 & 0 & \alpha_{\theta R}\end{pmatrix} \quad (21)$$

$$[H] = \begin{pmatrix}\eta_F\omega_F/r_F & 0 & 0 & 0\\0 & \eta_F\omega_F/r_F & 0 & 0\\0 & 0 & \eta_R\omega_R/r_R & 0\\0 & 0 & 0 & \eta_R\omega_R/r_R\end{pmatrix} \quad (22)$$

The above Formula (17) is developed to obtain the following Formula (23.)

$$\begin{pmatrix} \Delta\omega_1 \\ \Delta\omega_2 \\ \Delta\omega_3 \\ \Delta\omega_4 \end{pmatrix} = (D-G) \begin{pmatrix} \dot{Z}_{BG} \\ \dot{\theta}_{BG} \\ \dot{X}_{BG} \\ \dot{Y}_{BG} \\ \dot{\varphi}_{BG} \\ \dot{\psi}_{BG} \end{pmatrix} + (E-F) \begin{pmatrix} \dot{Z}_{A1} - \dot{Z}_{B1} \\ \dot{Z}_{A2} - \dot{Z}_{B2} \\ \dot{Z}_{A3} - \dot{Z}_{B3} \\ \dot{Z}_{A4} - \dot{Z}_{B4} \end{pmatrix} + H \begin{pmatrix} Z_{01} - Z_{A1} \\ Z_{02} - Z_{A2} \\ Z_{03} - Z_{A3} \\ Z_{04} - Z_{A4} \end{pmatrix} \quad (23)$$

$$= \begin{pmatrix} 0 & -H_F/r_F - 1 & 1/r_F & 0 & 0 & W_F/r_F \\ 0 & -H_F/r_F - 1 & 1/r_F & 0 & 0 & -W_F/r_F \\ 0 & -H_F/r_F - 1 & 1/r_R & 0 & 0 & W_R/r_R \\ 0 & -H_F/r_F - 1 & 1/r_R & 0 & 0 & -W_R/r_R \end{pmatrix} s \begin{pmatrix} Z_{BG} \\ \theta_{BG} \\ X_{BG} \\ Y_{BG} \\ \varphi_{BG} \\ \psi_{BG} \end{pmatrix} +$$

$$\begin{pmatrix} \alpha_{XF}/r_F - \alpha_{\theta F} & 0 & 0 & 0 \\ 0 & \alpha_{XF}/r_F - \alpha_{\theta F} & 0 & 0 \\ 0 & 0 & \alpha_{XR}/r_R - \alpha_{\theta R} & 0 \\ 0 & 0 & 0 & \alpha_{XR}/r_R - \alpha_{\theta R} \end{pmatrix} s \begin{pmatrix} Z_{A1} - Z_{B1} \\ Z_{A2} - Z_{B2} \\ Z_{A3} - Z_{B3} \\ Z_{A4} - Z_{B4} \end{pmatrix} +$$

$$\begin{pmatrix} \eta_F \omega_F/r_F & 0 & 0 & 0 \\ 0 & \eta_F \omega_F/r_F & 0 & 0 \\ 0 & 0 & \eta_R \omega_R/r_R & 0 \\ 0 & 0 & 0 & \eta_R \omega_R/r_R \end{pmatrix} \begin{pmatrix} Z_{01} - Z_{A1} \\ Z_{02} - Z_{A2} \\ Z_{03} - Z_{A3} \\ Z_{04} - Z_{A4} \end{pmatrix}$$

According to the above Formula (23), an in-phase component $(\Delta\omega_1+\Delta\omega_2)/2$ of the wheel speeds $\Delta\omega$ of the front wheels 12FL and 12FR and an in-phase component $(\Delta\omega_3+\Delta\omega_4)/2$ of the wheel speeds $\Delta\omega$ of the rear wheels 12RL and 12RR are expressed with the following Formula (24.)

$$\begin{bmatrix} \dfrac{\Delta\omega_1 + \Delta\omega_2}{2} \\ \dfrac{\Delta\omega_3 + \Delta\omega_4}{2} \end{bmatrix} = \begin{bmatrix} -\left(\dfrac{H_F}{r_F}+1\right)\theta_{BG} + \dfrac{X_{BG}}{r_F} \\ -\left(\dfrac{H_R}{r_R}+1\right)\theta_{BG} + \dfrac{X_{BG}}{r_R} \end{bmatrix} s + \quad (24)$$

$$\begin{bmatrix} \left(\dfrac{\alpha_{XF} - \alpha_{\theta F} r_F}{r_F}\right)\dfrac{(Z_{A1}+Z_{A2}-Z_{B1}-Z_{B2})}{2} \\ \left(\dfrac{\alpha_{XR} - \alpha_{\theta R} r_R}{r_R}\right)\dfrac{(Z_{A3}+Z_{A4}-Z_{B3}-Z_{B4})}{2} \end{bmatrix} +$$

$$\begin{bmatrix} \dfrac{\eta_F \omega_F}{r_F} \dfrac{(Z_{01}+Z_{02}-Z_{A1}-Z_{A2})}{2} \\ \dfrac{\eta_R \omega_R}{r_R} \dfrac{(Z_{03}+Z_{04}-Z_{A3}-Z_{A4})}{2} \end{bmatrix}$$

$$\cong -\begin{bmatrix} \dfrac{H}{r_F}\theta_{BG} \\ \dfrac{H}{r_R}\theta_{BG} \end{bmatrix} s +$$

$$\begin{bmatrix} \left(\dfrac{\alpha_{XF} - \alpha_{\theta F} r_F}{r_F}\right)\dfrac{(Z_{A1}+Z_{A2}-Z_{B1}-Z_{B2})}{2} \\ \left(\dfrac{\alpha_{XR} - \alpha_{\theta R} r_R}{r_R}\right)\dfrac{(Z_{A3}+Z_{A4}-Z_{B3}-Z_{B4})}{2} \end{bmatrix} s +$$

$$\begin{bmatrix} \dfrac{\eta_F \omega_F}{r_F} \dfrac{(Z_{01}+Z_{02}-Z_{A1}-Z_{A2})}{2} \\ \dfrac{\eta_R \omega_R}{r_R} \dfrac{(Z_{03}+Z_{04}-Z_{A3}-Z_{A4})}{2} \end{bmatrix}$$

As described above, as a time difference between the time point where the front and rear wheels pass the same position on a road surface is a value L/U that is derived by dividing a wheel base L ($=L_F+L_R$) by a vehicle speed U, displacements of the unsprungs of the rear wheels delay with the delay time L/U relative to displacemenst of the unsprungs of the front wheels. The above Formula (24) can be rewritten as the following Formula (25) with the delay time L/U.

$$\begin{bmatrix} (\Delta\omega_1 + \Delta\omega_2)/2 \\ (\Delta\omega_3 + \Delta\omega_4)/2 \end{bmatrix} = \quad (25)$$

$$-\begin{bmatrix} \dfrac{H}{r_F}\theta_{BG} \\ \dfrac{H}{r_R}\theta_{BG} \end{bmatrix} s + \begin{bmatrix} \left(\dfrac{\alpha_{XF}-\alpha_{\theta F} r_F}{r_F}\right)(Z_{A1}+Z_{A2}-Z_{B1}-Z_{B2})/2 \\ \left(\dfrac{\alpha_{XR}-\alpha_{\theta R} r_R}{r_R}\right)(Z_{A3}+Z_{A4}-Z_{B3}-Z_{B4})/2 \end{bmatrix} s +$$

$$\begin{bmatrix} \dfrac{\eta_F \omega_F}{r_F} \dfrac{(Z_{01}+Z_{02}-Z_{A1}-Z_{A2})}{2} \\ \dfrac{\eta_R \omega_R}{r_R} \dfrac{(Z_{01}+Z_{02}-Z_{A1}-Z_{A2})}{2} e^{-\tfrac{L}{U}s} \end{bmatrix}$$

The above Formula (25) is transformed into obtain the following Formula (26) and the latter Formula is transformed into obtain the following Formula (27.)

$$\begin{bmatrix} -\dfrac{H}{r_F} & \dfrac{\eta_F \omega_F}{r_F}\dfrac{1}{s} \\ -\dfrac{H}{r_R} & \dfrac{\eta_R \omega_R}{r_R}\dfrac{1}{s} e^{-\tfrac{L}{U}s} \end{bmatrix} \begin{bmatrix} \theta_{BG} \\ (Z_{01}+Z_{02}-Z_{A1}-Z_{A2})/2 \end{bmatrix} s = \quad (26)$$

$$\begin{bmatrix} (\Delta\omega_1+\Delta\omega_2)/2 - \left(\dfrac{\alpha_{XF}-\alpha_{\theta F} r_F}{r_F}\right)\dfrac{(Z_{A1}+Z_{A2}-Z_{B1}-Z_{B2})}{2} s \\ (\Delta\omega_3+\Delta\omega_4)/2 - \left(\dfrac{\alpha_{XR}-\alpha_{\theta R} r_R}{r_R}\right)\dfrac{(Z_{A3}+Z_{A4}-Z_{B3}-Z_{B4})}{2} s \end{bmatrix}$$

-continued $$\begin{bmatrix} \theta_{BG} \\ (Z_{01}+Z_{02}-Z_{A1}-Z_{A2})/2 \end{bmatrix} s = \begin{bmatrix} -\dfrac{H}{r_F} & \dfrac{\eta_F \omega_F}{r_F}\dfrac{1}{s} \\ -\dfrac{H}{r_R} & \dfrac{\eta_R \omega_R}{r_R}\dfrac{1}{s}e^{-\frac{L}{U}s} \end{bmatrix}^{-1} \cdot \quad (27)$$

$$\begin{bmatrix} (\Delta\omega_1+\Delta\omega_2)/2 - \left(\dfrac{\alpha_{XF}-\alpha_{\theta F} r_F}{r_F}\right)\dfrac{(Z_{A1}+Z_{A2}-Z_{B1}-Z_{B2})}{2}s \\ (\Delta\omega_3+\Delta\omega_4)/2 - \left(\dfrac{\alpha_{XR}-\alpha_{\theta R} r_R}{r_R}\right)\dfrac{(Z_{A3}+Z_{A4}-Z_{B3}-Z_{B4})}{2}s \end{bmatrix}$$

An in-phase vertical stroke of the suspensions 16F of the front wheels 12F is represented by $\Delta_{SFD}$ and an in-phase vertical stroke of the suspensions 16R of the rear wheels 12R is represented by $\Delta_{SRD}$. An in-phase deformation of the tires 13F of the front wheels 12F is represented by $\Delta_{TFD}$ and an in-phase deformation of the tires 13R of the rear wheels 12R is represented by $\Delta_{TRD}$. According to the above Formula (27), the following Formula (28) holds. A pitch angle $\theta_{BG}$ of the sprung and an in-phase deformation $\Delta_{TFD}$ of the tires 13F of the front wheels 12F can be calculated in accordance with the following Formula (28) on the basis of wheel speeds $\Delta\omega$ of the four wheels and vertical strokes Z of the four suspensions 16.

$$\begin{bmatrix} \theta_{BG} \\ \Delta_{TFD} \end{bmatrix} s = \quad (28)$$

$$\begin{bmatrix} -\dfrac{H}{r_F} & \dfrac{\eta_F \omega_F}{r_F}\dfrac{1}{s} \\ -\dfrac{H}{r_R} & \dfrac{\eta_R \omega_R}{r_R}\dfrac{1}{s}e^{-\frac{L}{U}s} \end{bmatrix}^{-1} \begin{bmatrix} \dfrac{\Delta\omega_1+\Delta\omega_2}{2} - (\alpha_{XF}/r_F - \alpha_{\theta F})\Delta_{SFD} s \\ \dfrac{\Delta\omega_3+\Delta\omega_4}{2} - (\alpha_{XR}/r_R - \alpha_{\theta R})\Delta_{SRD} s \end{bmatrix}$$

Notably, the following Formulae (29)-(32) hold with regard to in-phase vertical strokes $\Delta_{SFD}$ and $\Delta_{SRD}$ and in-phase deformations $\Delta_{TFD}$ and $\Delta_{TRD}$, respectively. A vertical stroke $\Delta_{SFD}$ is a value which can be derived as an average value of strokes Z1 and Z2 detected by the stroke sensors 32FL, 32FR provided for the front wheels 12FL, 12FR, respectively. In similar, a vertical stroke $\Delta_{SRD}$ is a value which can be derived as an average value of strokes Z3 and Z4 detected by the stroke sensors 32RL, 32RR provided for the rear wheels 12RL, 12RR, respectively. In addition, $Z_{01}$ and $Z_{02}$ in the following Formula (31) are vertical displacements of the unsprungs of the front wheels 12FL, 12FR, respectively in a situation where a deformation of each tire is 0. In similar, $Z_{03}$ and $Z_{04}$ in the following Formula (32) are vertical displacements of the unsprungs of the rear wheels 12RL, 12RR, respectively in a situation where a deformation of each tire is 0.

$$\Delta_{SFD}=(Z_{A1}+Z_{A2}-Z_{B1}-Z_{B2})/2 \quad (29)$$

$$\Delta_{SRD}=(Z_{A3}+Z_{A4}-Z_{B3}-Z_{B4})/2 \quad (30)$$

$$\Delta_{TFD}=(Z_{01}+Z_{02}-Z_{A1}+Z_{A2})/2 \quad (31)$$

$$\Delta_{TRD}=(Z_{03}+Z_{04}-Z_{A3}+Z_{A4})/2 \quad (32)$$

$(Z_{B1}+Z_{B2})/2$ in the above Formula (29) is a vertical displacement of the sprung at the axle positions TC of the front wheels and is equal to $Z_{BG}-L_F^*\theta_{BG}$. $(Z_{B3}+Z_{B4})/2$ in the above Formula (30) is a vertical displacement of the sprung at the axle positions TC of the rear wheels and is equal to $Z_{BG}+L_R^*\theta_{13G}$. In addition, a vertical displacement $(Z_{A3}+Z_{A4})/2$ of the unsprungs of the rear wheels delays with a delay time L/U relative to a vertical displacement $(Z_{A1}+Z_{A2})/2$ of the unsprung of the front wheels. Thus, the following Formulae (33) and (34) hold corresponding to the above Formulae (29) and (30).

$$(Z_{A1}+Z_{A2}-Z_{B1}-Z_{B2})/2=(Z_{A1}+Z_{A2})/2-(Z_{BG}L_F\theta_{BG}) = \Delta_{SFD} \quad (33)$$

$$(Z_{A3}+Z_{A4}-Z_{B3}-Z_{B4})/2=(Z_{A1}+Z_{A2})/2=(Z_{A1}+Z_{A2})/2e^{-L/U_s}-(Z_{BG}+L_R\theta_{BG})=\Delta_{SRD} \quad (34)$$

According to the above Formulae (33) and (34), the following Formula (35) holds and, by transforming the latter Formula, the following Formula (36) can be obtained. Thus, a vertical speed $Z_{BG}^*s$ of the sprung and an in-phase component $(Z_{A1}+Z_{A2})s/2$ of vertical speeds of the unsprungs of the front wheels can be calculated in accordance with the following Formula (36) on the basis of in-phase vertical strokes $\Delta_{SFD}$ and $\Delta_{SRD}$ and a pitch angle $\theta_{BG}$ of the sprung.

$$\begin{bmatrix} 1 & -1 \\ e^{-\frac{L}{U}s} & -1 \end{bmatrix}\begin{bmatrix} (Z_{A1}+Z_{A2})/2 \\ Z_{BG} \end{bmatrix}s = \begin{bmatrix} \Delta_{SFD}s - L_F\theta_{BG}s \\ \Delta_{SRD}s + L_R\theta_{BG}s \end{bmatrix} \quad (35)$$

$$\begin{bmatrix} (Z_{A1}+Z_{A2})/2 \\ Z_{BG} \end{bmatrix}s = \begin{bmatrix} 1 & -1 \\ e^{-\frac{L}{U}s} & -1 \end{bmatrix}^{-1}\begin{bmatrix} \Delta_{SFD}s - L_F\theta_{BG}s \\ \Delta_{SRD}s + L_R\theta_{BG}s \end{bmatrix} \quad (36)$$

Figure 2:
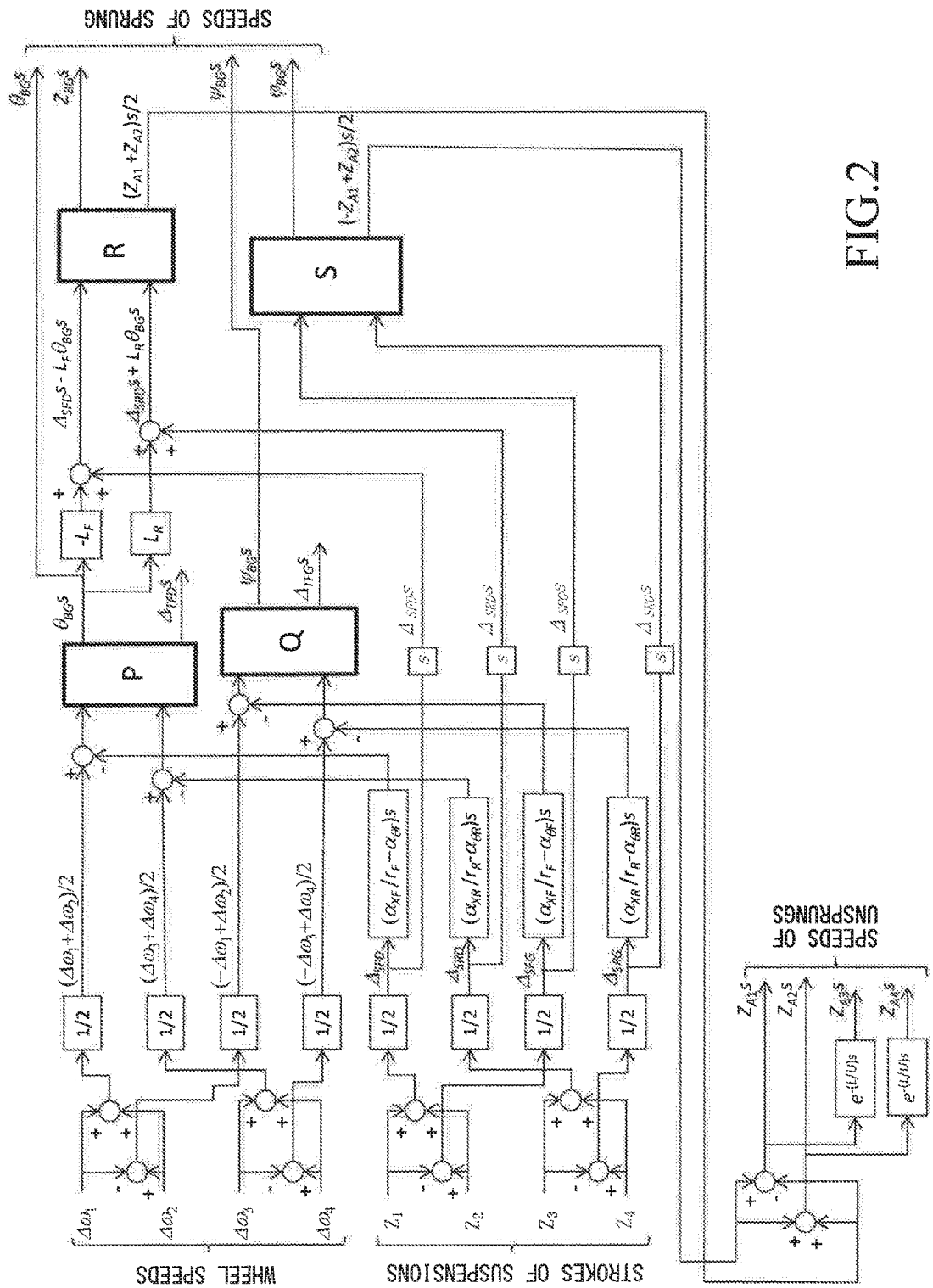
FIG. 2 illustrates a block diagram for use in the first embodiment with calculating various state quantities of the sprung and a state quantity (vertical speed) of the unsprung of each wheel.

"FIG. 2: Block Diagram for State Quantities Estimation"

FIG. 2 illustrates a block diagram for use in the first embodiment with estimating state quantities such as a vertical speed of the sprung and the like and vertical speeds of the unsprungs of the four wheels in the above-described manners. The calculations of a vertical speed of the sprung and the like executed in accordance with the block diagram illustrated in FIG. 2 are achieved by the electronic control unit 28.

As illustrated in FIG. 2, a vertical speed $Z_{BG}^*s$, a pitch angular speed $\theta_{BG}^*s$, a roll angular speed $\varphi_{BG}^*s$ and a yaw angular speed $\psi_{BG}^*s$ of the sprung can be calculated on the basis of wheel speeds $\Delta\omega$ of the four wheels 12 and vertical strokes Z of the four suspensions 16. In-phase and reverse phase components of vertical speeds of the unsprungs of the front wheels can be calculated on the basis of wheel speeds $\Delta\omega$ and vertical strokes Z, and vertical speeds $Z_{A1}^*s-Z_{A4}^*s$ of the usprungs of the four wheels 12 can be calculated on the basis of the components.

In the block diagram illustrated in FIG. 2, calculation blocks denoted by P-S execute the calculations of the above Formula (28), the following Formula (37), the above Formula (36) and the following Formula (38), respectively.

$$\begin{bmatrix} \psi_{BG} \\ \Delta_{TFG} \end{bmatrix} s = \begin{bmatrix} -\dfrac{W_F}{r_F} & \dfrac{\eta_F \omega_F}{r_F}\dfrac{1}{s} \\ -\dfrac{W_R}{r_R} & \dfrac{\eta_R \omega_R}{r_R}\dfrac{1}{s}e^{-\frac{L}{U}s} \end{bmatrix}^{-1} \quad (37)$$

$$\begin{bmatrix} (-\Delta\omega_1+\Delta\omega_2)/2 - (\alpha_{XF}/r_F - \alpha_{\theta F})\Delta_{SFG}s \\ (-\Delta\omega_3+\Delta\omega_4)/2 - (\alpha_{XR}/r_R - \alpha_{\theta R})\Delta_{SRG}s \end{bmatrix}$$

$$\begin{bmatrix} (-Z_{A1}+Z_{A2})/2 \\ \varphi_{BG} \end{bmatrix} s = \begin{bmatrix} 1 & -W_F \\ e^{-\frac{L}{U}s} & -W_R \end{bmatrix}^{-1} \begin{bmatrix} \Delta_{SFG}s \\ \Delta_{SRG}s \end{bmatrix} \quad (38)$$

It is to be noted that $\Delta_{SFG}$ in FIG. 2 and the above Formula (37) is a reverse phase vertical stroke of the suspensions 16F of the front wheels 12F and is calculated in accordance with the following Formula (39.) "$-Z_{A1}+Z_{B1}$" and "$Z_{A2}-Z_{B2}$" in the following Formula (39) are sign-inverted values of a stroke Z1 detected by the stroke sensor 32FL for the front wheel 12FL and a stroke Z2 detected by the stroke sensor 32FR for the front wheel 12FR, respectively. In similar, it is also to be noted that $\Delta_{SRG}$ is a reverse phase vertical stroke of the suspensions 16R of the rear wheels 12R and is calculated in accordance with the following Formula (40.) "$-Z_{A3}+Z_{B3}$" and "$Z_{A4}-Z_{B4}$" in the following Formula (40) are sign-inverted values of a stroke Z3 detected by the stroke sensor 32RL for the rear left wheel 12RL and a stroke Z4 detected by the stroke sensor 32RR for the rear right wheel 12RR, respectively.

$$\Delta_{SFG}=(-Z_{A1}+Z_{A2}+Z_{B1}-Z_{B2})/2 \qquad (39)$$

$$\Delta_{SRG}=(-Z_{A3}+Z_{A4}+Z_{B3}-Z_{B4})/2 \qquad (40)$$

Values input to the calculation block P are those which form the second matrix on the right side of the above Formula (28.) The calculation block P calculates a pitch angular speed $\theta_{BG}$*s of the sprung and a change rate $\Delta_{TFD}$*s of an in-phase component of deformations of the tires 13F of the front wheels 12F by multiplying the first and second matrixes on the right side of the above Formula (28.)

Values input to the calculation block Q are those which form the second matrix on the right side of the above Formula (37.) The calculation block Q calculates a yaw angular speed $\psi_{BG}$*s of the sprung and a change rate $\Delta_{TFG}$*s of a reverse phase component of deformations of the tires 13F of the front wheels 12F by multiplying the first and second matrixes on the right side of the above Formula (37.)

Values input to the calculation block R are those which form the second matrix on the right side of the above Formula (36.) The calculation block R calculates a vertical speed $(Z_{A1}+Z_{A2})s/2$ of the unsprungs of the front wheels and a vertical speed $Z_{BG}$*s of the sprung by multiplying the first and second matrixes on the right side of the above Formula (36.)

Values input to the calculation block S are those which form the second matrix on the right side of the above Formula (38.) The calculation block S calculates a roll speed $(-Z_{A1}+Z_{A2})s/2$ of the unsprungs of the front wheels and a roll speed $\varphi_{BG}$*s of the sprung by multiplying the first and second matrixes on the right side of the above Formula (38.)

Figure 3:
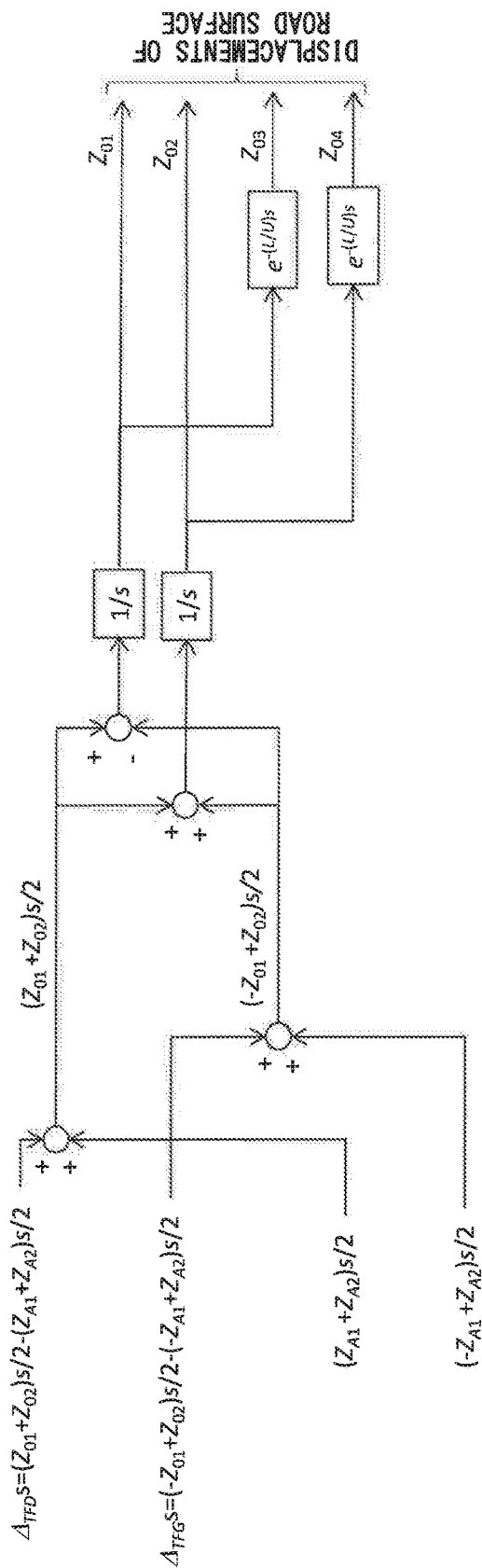
FIG. 3 illustrates a block diagram for use in the first embodiment with calculating vertical displacements of a road surface at positions of the wheels.

"FIG. 3: Block Diagram for Estimation of Vertical Displacement of Road Surface"

FIG. 3 illustrates a block diagram for use in the first embodiment with estimating vertical displacements $Z_{01}$-$Z_04$ of a road surface at positions of the wheels 12FL-12RR. The calculations of vertical displacements $Z_{01}$-$Z_04$ of a road surface executed in accordance with the block diagram illustrated in FIG. 3 are as well achieved by the electronic control unit 28.

With the block diagram illustrated in FIG. 3, vertical displacements $Z_{01}$-$Z_04$ of a road surface are calculated on the basis of a change rate $\Delta_{TFD}$*s of an in-phase deformation of the tires 13F of the front wheels 12F, a change rate $\Delta_{TFG}$*s of a reverse phase deformation of the tires 13F of the front wheels 12F, a vertical speed $(Z_{A1}+Z_{A2})s/2$ of the unsprungs of the front wheels and a roll speed $(-Z_{A1}+Z_{A2})s/2$ of the unsprungs of the front wheels that are calculated with the block diagram illustrated in FIG. 2. It is to be noted that in the other embodiments described later, vertical displacements $Z_{01}$-$Z_04$ of a road surface are calculated as well with the block diagram illustrated in FIG. 3.

As will be understood from the above descriptions, according to the first embodiment, wheel speed components that are in the same phase to left and right wheels for the front and rear wheels are calculated on the basis of wheel speeds $\Delta\omega_1$-$\Delta\omega_4$. As described above, as the behavior of the sprung which influences on components of wheel speeds that are in the same phase to the left and right wheels is pitching, a pitch angular speed $\theta_{BG}$*s of the sprung is calculated on the basis of the components of wheel speeds that are in the same phase to the left and right wheels.

Wheel speed components that are in the reverse phase to left and right wheels for the front and rear wheels are calculated on the basis of wheel speeds $\Delta\omega_1$-$\Delta\omega_4$. As described above, as the behavior of the sprung which influences on components of wheel speeds that are in the reverse phase to the left and right wheels is yawing, a yaw angular speed $\psi_{BG}$*s of the sprung is calculated on the basis of the components of wheel speeds that are in the reverse phase to the left and right wheels.

In-phase vertical stroke speeds $\Delta_{SFD}$*s and $\Delta_{SRD}$*s of the suspensions 16 of the front and rear wheels and reverse phase vertical stroke speeds $\Delta_{SFG}$*s and $\Delta_{SRG}$*s of the suspensions 16 of the front and rear wheels are calculated on the basis of strokes $Z_1$-$Z_4$ of the suspensions 16 of the front and rear wheels.

A vertical speed $Z_{BG}$*s of the sprung can be calculated by removement an influence of pitching of the sprung from the in-phase vertical stroke speeds $\Delta_{SFD}$*s and $\Delta_{SRD}$*s of the suspensions 16 of the front and rear wheels. Changes in vertical stroke speeds of the suspensions 16 of the rear wheels delay with a delay time L/U relative to changes in vertical stroke speeds of the suspensions 16 of the front wheels. Thus, an in-phase vertical stroke speed $\Delta_{SRD}$*s of the suspensions 16 of the rear wheels can be expressed using a delay time L/U and an in-phase vertical stroke speed $\Delta_{SFD}$*s of the suspensions 16 of the front wheels. Accordingly, a vertical speed $Z_{BG}$*s of the sprung can be calculated on the basis of a pitch angular speed $\theta_{BG}$*s of the sprung and an in-phase vertical stroke speed $\Delta_{SFD}$*s of the suspensions 16 of the front wheels.

As described above, the behavior of the sprung which influences on reverse phase components $\Delta_{SFG}$*s and $\Delta_{SRG}$*s of vertical stroke speeds of the suspensions 16 of the front and rear wheels is rolling. Thus, a roll angular speed $\varphi_{BG}$*s of the sprung is calculated on the basis of reverse phase components $\Delta_{SFG}$*S and $\Delta_{SRG}$*S of vertical stroke speeds of the suspensions 16 of the front and rear wheels.

An in-phase component $(Z_{A1}+Z_{A2})s/2$ of vertical speeds of the unsprungs of the front wheels is calculated on the basis of a pitch angular speed $\theta_{BG}$*s of the sprung and in-phase vertical stroke speeds $\Delta_{SFD}$*s and $\Delta_{SRD}$*s of the suspensions 16 of the front and rear wheels. A reverse phase component $(-Z_{A1}+Z_{A2})s/2$ of vertical speeds of the unsprungs of the front wheels is calculated on the basis of reverse phase components $\Delta_{SFG}$*S and $\Delta_{SRG}$*s of vertical stroke speeds of the suspensions 16 of the front and rear wheels.

Further, vertical speeds $Z_{A1}$*s and $Z_{A2}$*s of the usprungs of the front wheels 12FL and 12FR are calculated on the basis of an in-phase component $(Z_{A1}+Z_{A2})s/2$ and a reverse phase component $(-Z_{A1}+Z_{A2})s/2$ of vertical speeds of the unsprungs of the front wheels. Changes in vertical stroke speeds of the unsprungs of the rear wheels 12RL and 12RR delay with a delay time L/U relative to changes in vertical stroke speeds of the unsprungs of the front wheels 12FL and 12FR. Thus, vertical speeds $Z_{A3}$*s and $Z_{A4}$*s of the usprungs of the rear wheels 12RL and 12RR are calculated on the basis of vertical speeds $Z_{A1}$*s and $Z_{A2}$*s of the usprungs of the front wheels 12FL and 12FR and the delay time L/U.

As described above, wheel speeds $\Delta\omega_1$-$\Delta\omega_4$ are rotational speeds of the wheels 12FL-12RR, respectively, relative to the sprung. As expressed in the above Formula (13), wheel speeds $\Delta\omega$ are the same as rotational speeds w corresponding to longitudinal displacement of the wheels 12 (the tires 13) corrected with change amounts $d\theta_A$ of rotational speeds of the wheels 12 caused by pitching behavior of the sprung.

As expressed by the above Formulae (2) and (9), rotational speeds w corresponding to longitudinal displacement of the wheels 12 are corrected with change amounts $(dX_A-dX_B)$ of rotational speeds caused by the behavior of the sprung and change amounts $\eta^*\omega_0(\Delta r/r)$ of rotational speeds caused by changes in the radiuses r of the tires 13 due to deformations. Consequently, state quantities of the sprung and the unsprung can be estimated with higher accuracy as compared to where rotational speeds w are not corrected with change amounts $(dX_A-dX_B)$ of rotational speeds caused by the behavior of the sprung and change amounts $\eta^*\omega_0(\Delta r/r)$ of rotational speeds caused by changes in the radiuses r of the tires 13 due to deformations.

A longitudinal displacement $X_B$ of the sprung used for calculating longitudinal speed $dX_B$ of the sprung is calculated as a total of three displacements $X_{Ba}$, $X_{Bb}$ and $X_{Bc}$. Accordingly, as compared to where at least one of the three displacements $X_{Ba}$, $X_{Bb}$ and $X_{Bc}$ is not considered, a longitudinal speed $dX_B$ of the sprung can be calculated with higher accuracy, which enables to estimate state quantities of the sprung and the unsprung with higher accuracy.

In addition, as expressed by the above Formula (12), a longitudinal speed $dX_A$ of the sprung is corrected with a correction amount $\alpha_\theta(dX_A-dX_B)$ based on a vertical stroke speed of the suspension 16. Consequently, state quantities of the sprung and the unsprung can be estimated with higher accuracy as compared to where a longitudinal speed $dX_A$ of the sprung is not corrected with a correction amount based on a vertical stroke speed of the suspension 16. The effects generated by the corrections can as well be obtained in the other embodiments described later.

Second Embodiment

In a second embodiment, on the presupposition that a vertical transmitting force of each tire 13 is the same as a vertical transmitting force of the associated suspension 16, various state quantities of the sprung and vertical speeds of the unsprungs of the four wheels are estimated on the base of wheel speeds $\Delta\omega$ of the four wheels and strokes Z of the suspensions 16. Notably, in a vehicle such as an automobile and the like, when a frequency of vertical stroke speed of the suspension 16 is not higher than 10 Hz or so, estimation error due to the above presupposition is very small.

First, an in-phase component of wheel speeds $\Delta\omega$ will be described. According to the Formula (24) and the Formulae (29)-(32) in the above-described first embodiment, the following Formula (41) holds.

$$\begin{bmatrix}(\Delta\omega_1 + \Delta\omega_2)/2 \\ (\Delta\omega_3 + \Delta\omega_4)/2\end{bmatrix} = \qquad (41)$$

$$-\begin{bmatrix}\dfrac{H}{r_F}\theta_{BG} \\ \dfrac{H}{r_R}\theta_{BG}\end{bmatrix}s + \begin{bmatrix}\left(\dfrac{\alpha_{XF}-\alpha_{\theta F}r_F}{r_F}\right)\Delta_{SFD} \\ \left(\dfrac{\alpha_{XR}-\alpha_{\theta R}r_R}{r_R}\right)\Delta_{SRD}\end{bmatrix}s + \begin{bmatrix}\dfrac{\eta_F\omega_F}{r_F}\Delta_{TFD} \\ \dfrac{\eta_R\omega_R}{r_R}\Delta_{TRD}\end{bmatrix}$$

The unsprungs of the left and right front wheels 12FL and 12FR are assumed to have the same mass and the mass is denoted by $m_F$. In similar, the unsprungs of the left and right rear wheels 12RL and 12RR are assumed to have the same mass and the mass is denoted by $m_R$. Coefficients that transmit in-phase vertical strokes $\Delta_{SFD}$ and $\Delta_{SRD}$ of the suspensions 16 of the front and rear wheels to vertical forces are denoted by $K_{SFD}$ and $K_{SRD}$, respectively. Similarly, coefficients that transmit in-phase deformations $\Delta_{TFD}$ and $\Delta_{TRD}$ of the tires 13 of the front and rear wheels to vertical forces are denoted by $K_{TFD}$ and $K_{TRD}$, respectively.

In addition, vertical acceleration of the unsprungs of the front wheels 12FL, 12FR and the rear wheels 12RL, 12RR are denoted by $ddZ_{A1}$-$ddZ_{A4}$, respectively. According to the relationship between vertical forces of the unsprungs of the front and rear wheels, the following Formulae (42) and (43) hold, respectively. It is to be noted that coefficients $K_{SFD}$ and $K_{SRD}$ are determined by specifications of the suspensions 16 of the front and rear wheels, respectively (damping coefficients of the shock absorbers 20 and spring rates of the suspension springs 22.) Coefficients $K_{TFD}$ and $K_{TRD}$ are determined by specifications of the tires 13 of the front and rear wheels.

$$\Delta_{SFD}K_{SFD} = \Delta_{TFD}K_{TFD} - m_F(\ddot{Z}_{A1}+\ddot{Z}_{A2})/2 \qquad (42)$$

$$\Delta_{SRD}K_{SRD} = \Delta_{TRD}K_{TRD} - m_R(\ddot{Z}_{A3}+\ddot{Z}_{A4})/2 \qquad (43)$$

As inertia forces of the unsprungs, i.e. the second term on the right side of the above Formulae (42) and (43) are very small than the other forces, i.e. the term on the left side and the first term on the right side of the above Formulae (42) and (43), the following approximate Formulae (44) and (45) hold corresponding to the above Formulae (42) and (43.)

$$\Delta_{SFD} \cong \Delta_{TFD}K_{TFD}/K_{SFD} \qquad (44)$$

$$\Delta_{SRD} \cong \Delta_{TRD}K_{TRD}/K_{SRD} \qquad (45)$$

The following Formula (46) is derived by substituting the above Formulae (44) and (45) for the above Formula (41.)

$$\begin{bmatrix}(\Delta\omega_1 + \Delta\omega_2)/2 \\ (\Delta\omega_3 + \Delta\omega_4)/2\end{bmatrix} \cong -\begin{bmatrix}\dfrac{H}{r_F}\theta_{BG} \\ \dfrac{H}{r_R}\theta_{BG}\end{bmatrix}s + \begin{bmatrix}\left(\dfrac{\alpha_{XF}-\alpha_{\theta F}r_F}{r_F}\right)\Delta_{SFD} \\ \left(\dfrac{\alpha_{XR}-\alpha_{\theta R}r_R}{r_R}\right)\Delta_{SRD}\end{bmatrix}s + \qquad (46)$$

$$\begin{bmatrix}\dfrac{\eta_F\omega_F}{r_F}\Delta_{TFD} \\ \dfrac{\eta_R\omega_R}{r_R}\Delta_{TRD}\end{bmatrix}$$

$$= -\begin{bmatrix}\dfrac{H}{r_F}\theta_{BG} \\ \dfrac{H}{r_R}\theta_{BG}\end{bmatrix}s +$$

$$\begin{bmatrix}\left\{\left(\dfrac{\alpha_{XF}-\alpha_{\theta F}r_F}{r_F}\right)\dfrac{K_{TFD}}{K_{SFD}} + \dfrac{\eta_F\omega_F}{r_F}\dfrac{1}{s}\right\}\Delta_{TFD}s \\ \left\{\left(\dfrac{\alpha_{XR}-\alpha_{\theta R}r_R}{r_R}\right)\dfrac{K_{TRD}}{K_{SRD}} + \dfrac{\eta_R\omega_R}{r_R}\dfrac{1}{s}\right\}\Delta_{TRD}s\end{bmatrix}$$

As a change in an in-phase deformation $\Delta_{TRD}$ of the tire 13 of each rear wheel delays with a delay time L/U relative to a change in an in-phase deformation $\Delta_{TFD}$ of the tires 13 of the associated front wheel, the above Formula (46) can be rewritten as the following Formula (47.) In the following Formula (47), $K_{TF}$ and $K_{TR}$ are the same as $K_{TFD}$ and $K_{TRD}$, respectively, and $K_{SF}$ and $K_{SR}$ are the same as $K_{SFD}$ and $K_{SRD}$, respectively.

$$\begin{bmatrix}(\Delta\omega_1 + \Delta\omega_2)/2 \\ (\Delta\omega_3 + \Delta\omega_4)/2\end{bmatrix} = \qquad (47)$$

-continued $$-\begin{bmatrix} \frac{H}{r_F}\theta_{BG} \\ \frac{H}{r_R}\theta_{BG} \end{bmatrix} s + \begin{bmatrix} \left\{\left(\frac{\alpha_{XF}-\alpha_{\theta F}r_F}{r_F}\right)\frac{K_{TF}}{K_{SF}}+\frac{\eta_F\omega_F}{r_F}\frac{1}{s}\right\}\Delta_{TFD}s \\ \left\{\left(\frac{\alpha_{XR}-\alpha_{\theta R}r_R}{r_R}\right)\frac{K_{TR}}{K_{SR}}+\frac{\eta_R\omega_R}{r_R}\frac{1}{s}\right\}\Delta_{TRD}se^{-\frac{L}{U}s} \end{bmatrix}$$

The above Formula (47) can be transformed into the following Formula (48) and can further be transformed into the following Formula (49.)

$$\begin{bmatrix} -\frac{H}{r_F} & \left\{\left(\frac{\alpha_{XF}-\alpha_{\theta F}r_F}{r_F}\right)\frac{K_{TF}}{K_{SF}}+\frac{\eta_F\omega_F}{r_F}\frac{1}{s}\right\} \\ -\frac{H}{r_F} & \left\{\left(\frac{\alpha_{XR}-\alpha_{\theta R}r_R}{r_R}\right)\frac{K_{TR}}{K_{SR}}+\frac{\eta_R\omega_R}{r_R}\frac{1}{s}\right\}e^{-\frac{L}{U}s} \end{bmatrix}\begin{bmatrix} \theta_{BG} \\ \Delta_{TFD} \end{bmatrix}s = \tag{48}$$

$$\begin{bmatrix} (\Delta\omega_1+\Delta\omega_2)/2 \\ (\Delta\omega_3+\Delta\omega_4)/2 \end{bmatrix}$$

$$\begin{bmatrix} \theta_{BG} \\ \Delta_{TFD} \end{bmatrix}s = \begin{bmatrix} -\frac{H}{r_F} & \left\{\left(\frac{\alpha_{XF}-\alpha_{\theta F}r_F}{r_F}\right)\frac{K_{TF}}{K_{SF}}+\frac{\eta_F\omega_F}{r_F}\frac{1}{s}\right\} \\ -\frac{H}{r_F} & \left\{\left(\frac{\alpha_{XR}-\alpha_{\theta R}r_R}{r_R}\right)\frac{K_{TR}}{K_{SR}}+\frac{\eta_R\omega_R}{r_R}\frac{1}{s}\right\}e^{-\frac{L}{U}s} \end{bmatrix}^{-1} \tag{49}$$

$$\begin{bmatrix} (\Delta\omega_1+\Delta\omega_2)/2 \\ (\Delta\omega_3+\Delta\omega_4)/2 \end{bmatrix}$$

As a change in an in-phase deformation $\Delta_{TRD}$ of the tire 13 of each rear wheel delays with a delay time L/U relative to a change in an in-phase deformation $\Delta_{TFD}$ of the tire 13 of the associated front wheel, the above Formula (45) can be rewritten as the following Formula (50) using the delay time L/U.

$$\Delta_{SRD} \cong \Delta_{TFD}e^{-\frac{L}{U}s}K_{TRD}/K_{SRD} \tag{50}$$

A pitch angle $\theta_{BG}$ of the sprung and an in-phase deformation $\Delta_{TFD}$ of the tires 13 of the front wheels can be calculated on the basis of wheel speeds $\Delta\omega_1$-$\Delta\omega_4$ of the four wheels. If an in-phase deformation $\Delta_{TFD}$ is calculated, in-phase vertical stroke speeds $\Delta_{SFD}$*s and $\Delta_{SRD}$*s of the suspensions 16 of the front and rear wheels can be calculated in accordance with the above Formulae (44) and (45.)

As already described in the description of the first embodiment, the above Formula (36) holds. Consequently, a vertical speed $Z_{BG}$*s of the sprung and an in-phase component $(Z_{A1}+Z_{A2})$s/2 of vertical speeds of the unsprungs of the front wheels can be calculated by substituting a pitch angle $\theta_{BG}$ of the sprung and in-phase vertical strokes $\Delta_{SFD}$ and $\Delta_{SRD}$ that are calculated as above for the following Formula (36.) In other word, a vertical speed $Z_{BG}$*s of the sprung and an in-phase component $(Z_{A1}+Z_{A2})$s/2 of vertical speeds of the unsprungs of the front wheels can be calculated on the basis of in-phase vertical strokes $\Delta_{SFD}$ and $\Delta_{SRD}$ and a pitch angle $\theta_{BG}$ of the sprung.

Next, reverse phase components of wheel speeds $\Delta\omega$ will be described. According to the above Formulae (23), a reverse phase component $(-\Delta\omega_1+\Delta\omega_2)/2$ of wheel speeds $\Delta\omega$ of the front wheels 12FL, 12FR and a reverse phase component $(-\Delta\omega_3+\Delta\omega_4)/2$ of wheel speeds $\Delta\omega$ of the rear wheels 12RL, 12RR are expressed by the following Formula (51.)

$$\begin{bmatrix} \frac{-\Delta\omega_1+\Delta\omega_2}{2} \\ \frac{-\Delta\omega_3+\Delta\omega_4}{2} \end{bmatrix} = \tag{51}$$

$$-\begin{bmatrix} \frac{W_F}{r_F}\psi_{BG} \\ \frac{W_R}{r_R}\psi_{BG} \end{bmatrix}s + \begin{bmatrix} \left(\frac{\alpha_{XF}-\alpha_{\theta F}r_F}{r_F}\right)\frac{(-Z_{A1}+Z_{A2})-(-Z_{B1}+Z_{B2})}{2} \\ \left(\frac{\alpha_{XR}-\alpha_{\theta R}r_R}{r_R}\right)\frac{(-Z_{A3}+Z_{A4})-(-Z_{B3}+Z_{B4})}{2} \end{bmatrix}$$

$$s + \begin{bmatrix} \frac{\eta_F\omega_F}{r_F}\frac{(-Z_{01}+Z_{02})-(-Z_{A1}+Z_{A2})}{2} \\ \frac{\eta_R\omega_R}{r_R}\frac{(-Z_{03}+Z_{04})-(-Z_{A3}+Z_{A4})}{2} \end{bmatrix}$$

As displacements of the unsprungs of the rear wheels delay with a delay time L/U relative to displacements of the unsprungs of the front wheels, the above Formula (51) can be rewritten as the following Formula (52) using the delay time L/U. The following Formula (52) can be transformed into the following Formula (53.)

$$\begin{bmatrix} -\frac{W_F}{r_F}s & \frac{\eta_F\omega_F}{r_F} \\ -\frac{W_F}{r_F}s & \frac{\eta_F\omega_F}{r_F}e^{-\frac{L}{U}s} \end{bmatrix}\begin{bmatrix} \psi_{BG} \\ \frac{(-Z_{01}+Z_{02})-(-Z_{A1}+Z_{A2})}{2} \end{bmatrix} = \tag{52}$$

$$\begin{bmatrix} \frac{-\Delta\omega_1+\Delta\omega_2}{2}-\left(\frac{\alpha_{XF}-\alpha_{\theta F}r_F}{r_F}\right)\frac{(-Z_{A1}+Z_{A2})-(-Z_{B1}+Z_{B2})}{2}s \\ \frac{-\Delta\omega_3+\Delta\omega_4}{2}-\left(\frac{\alpha_{XR}-\alpha_{\theta R}r_R}{r_R}\right)\frac{(-Z_{A3}+Z_{A4})-(-Z_{B3}+Z_{B4})}{2}s \end{bmatrix}$$

$$\begin{bmatrix} \psi_{BG} \\ \frac{(-Z_{01}+Z_{02})-(-Z_{A1}+Z_{A2})}{2} \end{bmatrix}s = \begin{bmatrix} -\frac{W_F}{r_F} & \frac{\eta_F\omega_F}{r_F}\frac{1}{s} \\ -\frac{W_F}{r_F} & \frac{\eta_F\omega_F}{r_F}\frac{1}{s}e^{-\frac{L}{U}s} \end{bmatrix}^{-1} \tag{53}$$

$$\begin{bmatrix} \frac{-\Delta\omega_1+\Delta\omega_2}{2}-\left(\frac{\alpha_{XF}-\alpha_{\theta F}r_F}{r_F}\right)\frac{(-Z_{A1}+Z_{A2})-(-Z_{B1}+Z_{B2})}{2}s \\ \frac{-\Delta\omega_3+\Delta\omega_4}{2}-\left(\frac{\alpha_{XR}-\alpha_{\theta R}r_R}{r_R}\right)\frac{(-Z_{A3}+Z_{A4})-(-Z_{B3}+Z_{B4})}{2}s \end{bmatrix}$$

According to the above Formula (53) and the above Formulae (39) and (40), the above Formula (37) holds. Accordingly, a yaw angular speed $\psi_{BG}$*s of the sprung and a change rate $\Delta_{TFG}$*s of a reverse phase deformation of the tires 13FL, 13FR of the front wheels 12FL, 12FR, respectively, can be calculated on the basis of wheel speeds $\Delta\omega$ of the four wheels and strokes Z of the four suspensions 16.

It is to be noted that the following Formulae (54) and (55) hold for reverse phase deformations $\Delta_{TFG}$ and $\Delta_{TRG}$ of the tires.

$$\Delta_{TFG}=(-Z_{01}+Z_{02}+Z_{A1}+Z_{A2})/2 \tag{54}$$

$$\Delta_{TRG}=(-Z_{03}+Z_{04}+Z_{A3}+Z_{A4})/2 \tag{55}$$

$(-Z_{A1}+Z_{A2})/2$ in the above Formula (39) is a roll angle of the sprung at the axle positions TC of the front wheels and is equal to $W_F$*$\varphi_{BG}$. Similarly, $(-Z_{A3}+Z_{A4})/2$ in the above Formula (40) is a roll angle of the sprung at the axle positions TC of the rear wheels and is equal to $W_R$*$\varphi_{BG}$. In addition, a roll angle $(-Z_{A3}+Z_{A4})/2$ of the sprung of the rear wheels delays with a delay time L/U relative to a roll angle $(-Z_{A1}+Z_{A2})/2$ of the sprung of the front wheels. Thus, the following Formulae (56) and (57) hold corresponding to the above Formulae (39) and (40.)

$$\frac{(-Z_{A1} + Z_{A2}) - (-Z_{B1} + Z_{B2})}{2} = \frac{(-Z_{A1} + Z_{A2})}{2} - W_F \varphi_{BG} = \Delta_{SFG} \tag{56}$$

$$\frac{(-Z_{A3} + Z_{A4}) - (-Z_{B3} + Z_{B4})}{2} = \frac{(-Z_{A1} + Z_{A2})}{2} e^{-\frac{L}{U}s} - W_R \varphi_{BG} = \Delta_{SRG} \tag{57}$$

According to the above Formulae (56) and (57), the following Formula (58) holds and, by transforming the latter Formula, the above Formula (38) can be obtained. Thus, a roll speed $(-Z_{A1}+Z_{A2})s/2$ of the sprung of the front wheels and a roll angular speed $\varphi_{BG}{}^*s$ of the sprung can be calculated in accordance with the above Formula (38) on the basis of strokes Z of the suspensions 16 of the wheels 12.

$$\begin{bmatrix} 1 & -W_F \\ e^{-\frac{L}{U}s} & -W_R \end{bmatrix} \begin{bmatrix} (-Z_{A1} + Z_{A2})/2 \\ \varphi_{BG} \end{bmatrix} s = \begin{bmatrix} \Delta_{SFG}s \\ \Delta_{SRG}s \end{bmatrix} \tag{58}$$

Figure 11:
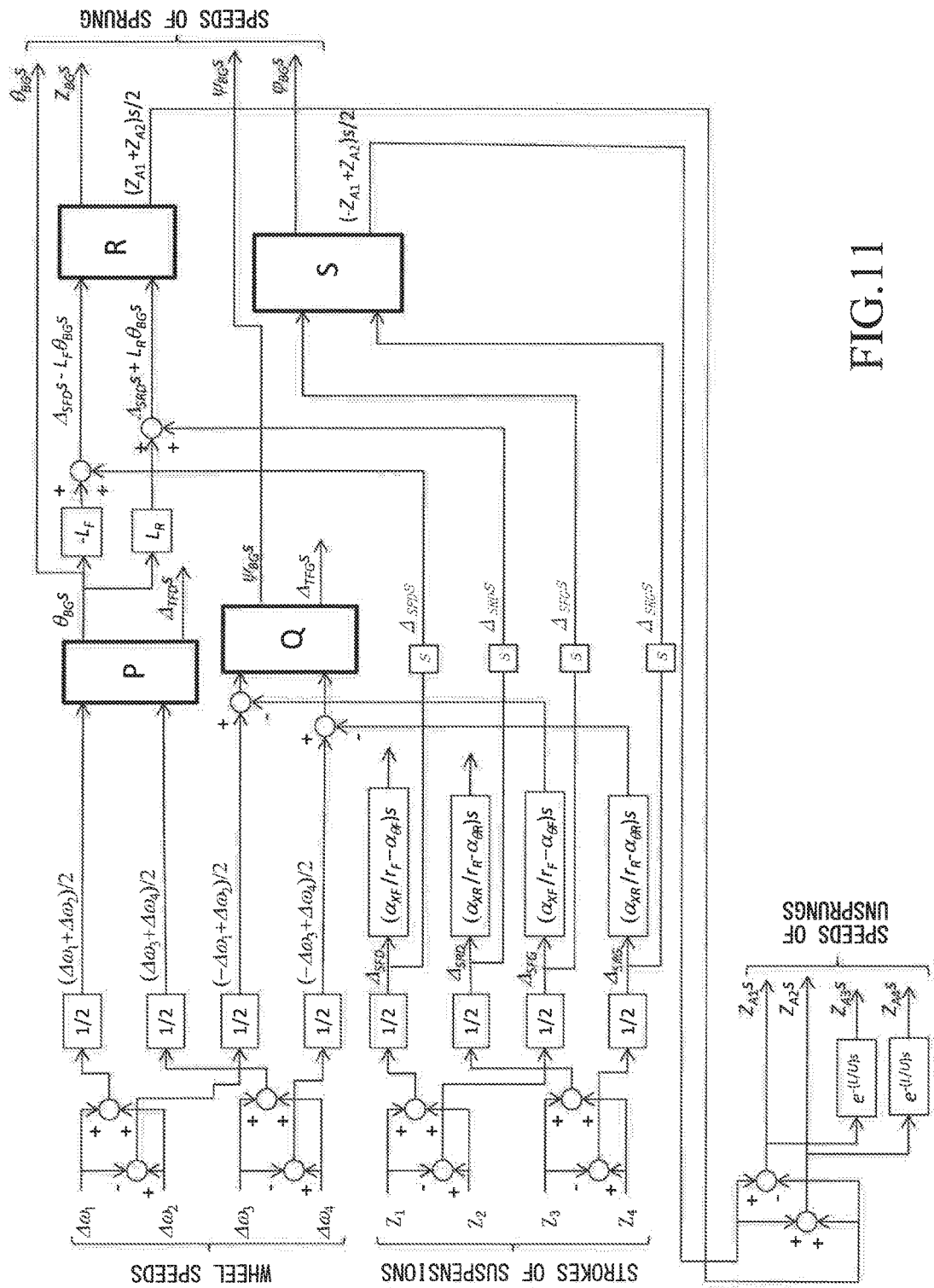
FIG. 11 illustrates a block diagram for use in a second embodiment with calculating various state quantities of the sprung and a state quantity (vertical speed) of the unsprung of each wheel.

"FIG. 11: Block Diagram for State Quantities Estimation"

FIG. 11 illustrates a block diagram for use in the second embodiment with estimating state quantities such as a vertical speed of the sprung and the like and estimating vertical speeds of the unsprungs of the four wheels in the above-described manners. The calculations of a vertical speed of the sprung and the like executed in accordance with the block diagram illustrated in FIG. 11 are also achieved by the electronic control unit 28.

As is understood by comparing FIGS. 11 and 2, the calculation blocks denoted by Q-S execute the calculations of the above Formulae (37), (36) and (38), respectively. However, in the second embodiment, change amounts $(\alpha_{XF}/r_F - \alpha_{\theta F}) \Delta_{SFD}{}^*s$ and $(\alpha_{XR}/r_R - \alpha_{\theta R}) \Delta_{SRD}{}^*s$ of wheel speeds that are caused by vertical strokes of the suspensions 16 of the front and rear wheels are not input to the calculation block P.

Values input to the calculation block P are those which form the second matrix on the right side of the above Formula (49), i.e., an in-phase component of the wheel speeds $\Delta\omega$ of the front left and right wheels and an in-phase component of the wheel speeds $\Delta\omega$ of the rear left and right wheels. The calculation block P calculates a pitch angular speed $\theta_{BG}{}^*s$ of the sprung and a change rate $\Delta_{TFD}{}^*s$ of an in-phase deformation of the tires 13FL, 13FR of the front wheels 12FL, 12FR, respectively, by multiplying the first and second matrixes on the right side of the above Formula (49.)

As will be understood from the above descriptions, in the second embodiment, a vertical speed $Z_{BG}{}^*s$, a pitch angular speed $\theta_{BG}{}^*s$, a roll angular speed $\varphi_{BG}{}^*s$ and a yaw angular speed $\psi_{BG}{}^*s$ of the sprung can as well be calculated on the basis of wheel speeds $\Delta\omega$ of the four wheels and vertical strokes Z of the suspensions 16. An in-phase component and a reverse phase component of vertical strokes of the suspensions 16 of the front wheels can be calculated on the basis of wheel speeds $\Delta\omega$ and vertical strokes Z of the suspensions 16, and on the basis of these values, vertical speeds $Z_{A1}{}^*s$-$Z_{A4}{}^*s$ of the usprungs of the wheels 12 can be calculated.

Specifically, according to the second embodiment, change amounts $(\alpha_{XF}/r_F - \alpha_{\theta F}) \Delta_{SFD}{}^*s$ and $(\alpha_{XR}/r_R - \alpha_{\theta R}) \Delta_{SRD}{}^*s$ that are caused by vertical strokes of the suspensions 16 of the front and rear wheels are not calculated. Accordingly, state quantities of the sprung and the unsprungs that are calculated in the first embodiment can be calculated without calculating the change amounts.

Third Embodiment

In a third embodiment, as in the second embodiment, on the presupposition that a vertical transmitting force of the tire 13 is the same as a vertical transmitting force of the suspension 16, various state quantities of the sprung and vertical speeds of the unsprungs of the four wheels are estimated on the base of wheel speeds of the four wheels and strokes Z of the suspensions 16.

According to the Formula (51) in the second embodiment, the Formulae (39) and (40) and the above Formulae (55) and (56), the following Formula (59) holds.

$$\begin{bmatrix} \frac{-\Delta\omega_1 + \Delta\omega_2}{2} \\ \frac{-\Delta\omega_3 + \Delta\omega_4}{2} \end{bmatrix} = \tag{59}$$

$$-\begin{bmatrix} \frac{W_F}{r_F} \Psi_{BG} \\ \frac{W_R}{r_R} \Psi_{BG} \end{bmatrix} s + \begin{bmatrix} \left(\frac{\alpha_{XF} - \alpha_{\theta F} r_F}{r_F}\right) \Delta_{SFG} \\ \left(\frac{\alpha_{XR} - \alpha_{\theta R} r_R}{r_R}\right) \Delta_{SRG} \end{bmatrix} s + \begin{bmatrix} \frac{\eta_F \omega_F}{r_F} \Delta_{TFG} \\ \frac{\eta_R \omega_R}{r_R} \Delta_{TRG} \end{bmatrix}$$

The following approximate Formulae (44') and (45') hold corresponding to the above Formulae (44) and (45), respectively in the second embodiment. Consequently, the following Formula (60) can be obtained by substituting the above Formulae (44') and (45') for the above Formula (59.) In the following Formulae (44') and (45'), $K_{TFG}$ and $K_{TRG}$ are coefficients that transmit reverse phase vertical strokes $\Delta_{SFG}$ and $\Delta_{SRG}$ of the suspensions 16 of the front and rear wheels to vertical forces and are determined by the specification of the tires 13 of the front and rear wheels, respectively. $K_{SFG}$ and $K_{SRG}$ are coefficients that transmit reverse phase deformations $\Delta_{TFG}$ and $\Delta_{TRG}$ of the tires 13 of the front and rear wheels to vertical forces and are determined by the specification (damping coefficients of the shock absorbers 20 and spring rates of the suspension springs 22) of the suspensions 13 of the front and rear wheels, respectively.

$$\Delta_{SFG} \cong \Delta_{TRG} K_{TFG} / K_{SFG} \tag{44'}$$

$$\Delta_{SRG} \cong \Delta_{TRG} K_{TRG} / K_{SRG} \tag{45'}$$

-continued $$\begin{bmatrix}(-\Delta\omega_1+\Delta\omega_2)/2\\(-\Delta\omega_3+\Delta\omega_4)/2\end{bmatrix}=-\begin{bmatrix}\dfrac{W_F}{r_F}\psi_{BG}\\\dfrac{W_R}{r_R}\psi_{BG}\end{bmatrix}s+\begin{bmatrix}\left(\dfrac{\alpha_{XF}-\alpha_{\theta F}r_F}{r_F}\right)\Delta_{SFG}\\\left(\dfrac{\alpha_{XR}-\alpha_{\theta R}r_R}{r_R}\right)\Delta_{SRG}\end{bmatrix}s+$$

$$\begin{bmatrix}\dfrac{\eta_F\omega_F}{r_F}\Delta_{TFG}\\\dfrac{\eta_R\omega_R}{r_R}\Delta_{TRG}\end{bmatrix}$$

$$\cong-\begin{bmatrix}\dfrac{W_F}{r_F}\psi_{BG}\\\dfrac{W_R}{r_R}\psi_{BG}\end{bmatrix}s+\begin{bmatrix}\left\{\left(\dfrac{\alpha_{XF}-\alpha_{\theta F}r_F}{r_F}\right)\dfrac{K_{TFG}}{K_{SFG}}+\dfrac{\eta_F\omega_F}{r_F}\dfrac{1}{s}\right\}\Delta_{TFG}s\\\left\{\left(\dfrac{\alpha_{XR}-\alpha_{\theta R}r_R}{r_R}\right)\dfrac{K_{TRG}}{K_{SRG}}+\dfrac{\eta_R\omega_R}{r_R}\dfrac{1}{s}\right\}\Delta_{TRG}s\end{bmatrix}$$

(60)

As a change in reverse phase deformation $\Delta_{TRG}$ of the tires 13 of the rear wheels delays with a delay time L/U relative to a change in reverse phase deformation $\Delta_{TFG}$ of the tires 13 of the front wheels, the above Formula (60) can be rewritten as the following Formula (61.)

$$\begin{bmatrix}(-\Delta\omega_1+\Delta\omega_2)/2\\(-\Delta\omega_3+\Delta\omega_4)/2\end{bmatrix}=$$

$$-\begin{bmatrix}\dfrac{W_F}{r_F}\psi_{BG}\\\dfrac{W_R}{r_R}\psi_{BG}\end{bmatrix}s+\begin{bmatrix}\left\{\left(\dfrac{\alpha_{XF}-\alpha_{\theta F}r_F}{r_F}\right)\dfrac{K_{TFG}}{K_{SFG}}+\dfrac{\eta_F\omega_F}{r_F}\dfrac{1}{s}\right\}\Delta_{TFG}s\\\left\{\left(\dfrac{\alpha_{XR}-\alpha_{\theta R}r_R}{r_R}\right)\dfrac{K_{TRG}}{K_{SRG}}+\dfrac{\eta_R\omega_R}{r_R}\dfrac{1}{s}\right\}\Delta_{TFG}se^{-\frac{L}{U}s}\end{bmatrix}$$

(61)

The above Formula (61) can be transformed into the following Formula (62) and can further be transformed into the following Formula (63.) According to the following Formula (63), a yaw angular speed $\psi_{BG}*s$ of the sprung and a change rate $\Delta_{TFG}*s$ of a reverse phase deformation of the tires 13F of the front wheels can be calculated.

$$\begin{bmatrix}-\dfrac{W_F}{r_F}&\left\{\left(\dfrac{\alpha_{XF}-\alpha_{\theta F}r_F}{r_F}\right)\dfrac{K_{TFG}}{K_{SFG}}+\dfrac{\eta_F\omega_F}{r_F}\dfrac{1}{s}\right\}\\-\dfrac{W_R}{r_R}&\left\{\left(\dfrac{\alpha_{XR}-\alpha_{\theta R}r_R}{r_R}\right)\dfrac{K_{TRG}}{K_{SRG}}+\dfrac{\eta_R\omega_R}{r_R}\dfrac{1}{s}\right\}e^{-\frac{L}{U}s}\end{bmatrix}\begin{bmatrix}\Psi_{BG}\\\Delta_{TFG}\end{bmatrix}s=$$

$$\begin{bmatrix}(-\Delta\omega_1+\Delta\omega_2)/2\\(-\Delta\omega_3+\Delta\omega_4)/2\end{bmatrix}$$

(62)

$$\begin{bmatrix}\Psi_{BG}\\\Delta_{TFG}\end{bmatrix}s=\begin{bmatrix}-\dfrac{W_F}{r_F}&\left\{\left(\dfrac{\alpha_{XF}-\alpha_{\theta F}r_F}{r_F}\right)\dfrac{K_{TFG}}{K_{SFG}}+\dfrac{\eta_F\omega_F}{r_F}\dfrac{1}{s}\right\}\\-\dfrac{W_R}{r_R}&\left\{\left(\dfrac{\alpha_{XR}-\alpha_{\theta R}r_R}{r_R}\right)\dfrac{K_{TRG}}{K_{SRG}}+\dfrac{\eta_R\omega_R}{r_R}\dfrac{1}{s}\right\}e^{-\frac{L}{U}s}\end{bmatrix}^{-1}$$

$$\begin{bmatrix}(-\Delta\omega_1+\Delta\omega_2)/2\\(-\Delta\omega_3+\Delta\omega_4)/2\end{bmatrix}$$

(63)

The following approximate Formulae (64) and (65) hold corresponding to the above Formulae (44) and (50), respectively, in the second embodiment. Notably, the following approximate Formula (64) is the same as the above Formula (44'.) Consequently, if a reverse phase deformation $\Delta_{TFG}$ is calculated, reverse phase vertical strokes $\Delta_{SFG}$ and $\Delta_{SRG}$ of the suspensions 16 of the front and rear wheels can be calculated in accordance with the following Formulae (64) and (65.)

$$\Delta_{SFG}\cong\Delta_{TFG}K_{TFG}/K_{SFG}$$ (64)

$$\Delta_{SRG}\cong\Delta_{TFG}e^{-\frac{L}{U}s}K_{TRG}/K_{SRG}$$ (65)

In the third embodiment, the above Formulae (56) and (56) as well hold and, accordingly, the above Formulae (58) and (38) as well hold. Thus, a roll speed $(-Z_{A1}+Z_{A2})s/2$ of the unsprungs of the front wheels and a roll angular speed $\varphi_{BG}*s$ of the sprung can be calculated in accordance with the above Formula (38) on the basis of reverse phase vertical strokes $\Delta_{SFG}$ and $\Delta_{SRG}$ calculated in the above-described manners.

Figure 12:
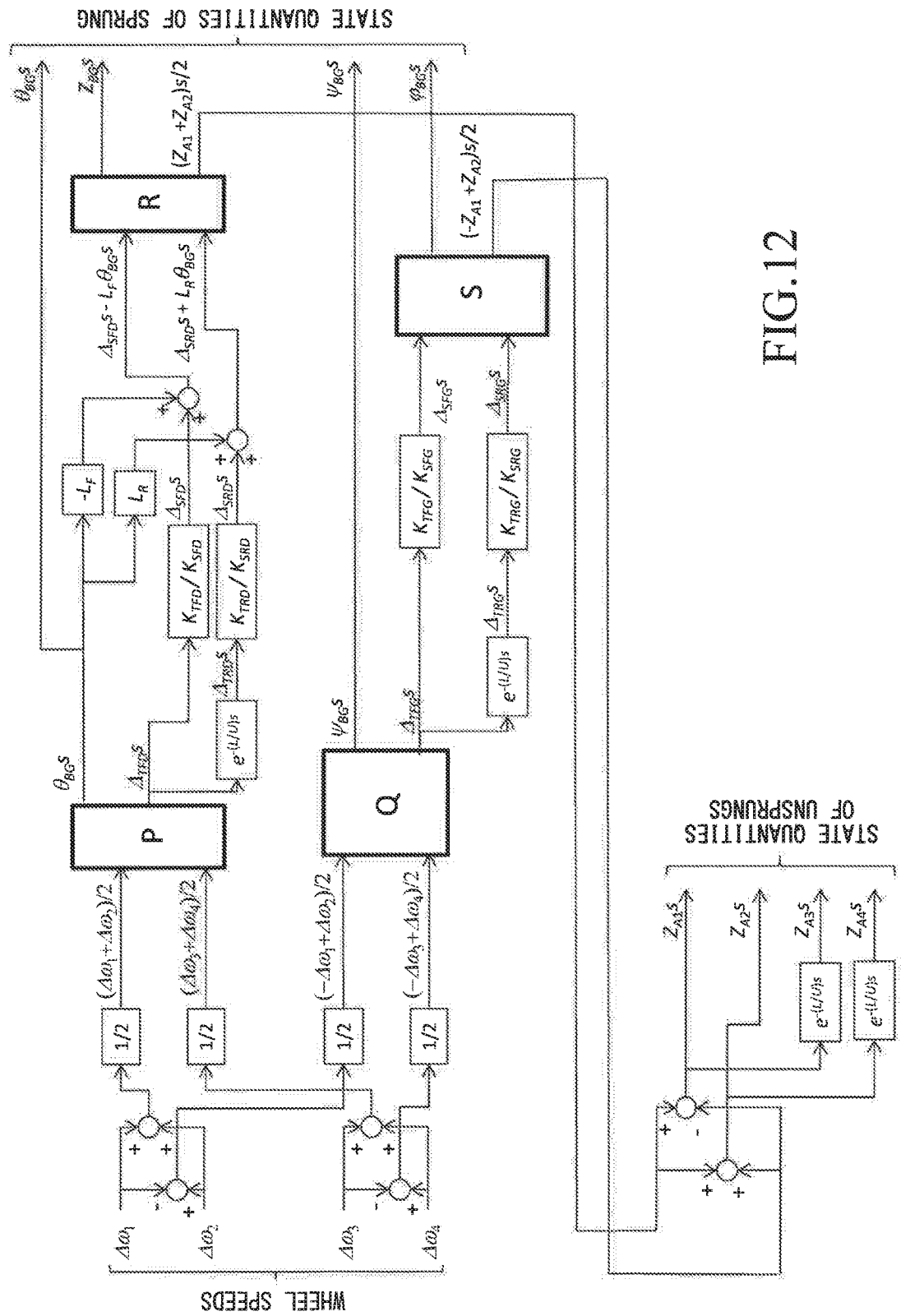
FIG. 12 illustrates a block diagram for use in a third embodiment with calculating various state quantities of the sprung and a state quantity (vertical speed) of the unsprung of each wheel.

"FIG. 12: Block Diagram for State Quantities Estimation"

FIG. 12 illustrates a block diagram for use in the third embodiment with estimating a vertical speed of the sprung and vertical speeds of the unsprungs of the front wheels and estimating vertical speeds of the unsprungs of the four wheels in the above-described manners. The calculations of a vertical speed of the sprung and the like executed in accordance with the block diagram illustrated in FIG. 12 are also achieved by the electronic control unit 28.

As is understood by comparing FIGS. 12 and 2, in the block diagram in the third embodiment, vertical strokes $Z_1$-$Z_4$ of the suspensions 16 of the wheels are not input. Consequently, state quantities of the sprung and the unsprungs which are the same as those that are calculated in the first and second embodiments can be calculated only on the basis of wheel speeds $\Delta\omega_1$-$\Delta\omega_4$ of the wheels.

As in the first and second embodiments, the calculation blocks R and S execute the calculations of the above Formulae (36) and (38), respectively. However, in the third embodiment, change amounts $(\alpha_{XF}/r_F-\alpha_{\theta F})$ $\Delta_{SFD}*s$ and $(\alpha_{XR}/r_R-\alpha_{\theta R})$ $\Delta_{SRD}*s$ of wheel speeds that are caused by vertical strokes of the suspensions 16 of the front and rear wheels are not input to the calculation blocks P and Q.

Values input to the calculation block P are those which form the second matrix on the right side of the above Formula (66), i.e., an in-phase component of the wheel speeds $\Delta\omega$ of the front left and right wheels and an in-phase component of the wheel speeds $\Delta\omega$ of the rear left and right wheels. The calculation block P calculates a pitch angular speed $\theta_{BG}*s$ of the sprung and a change rate $\Delta_{TFD}*s$ of an in-phase deformation of the tires 13FL, 13FR of the front wheels 12FL, 12FR, respectively, by multiplying the first and second matrixes on the right side of the following Formula (66.)

$$\begin{bmatrix} \theta_{BG} \\ \Delta_{TFD} \end{bmatrix} s = \begin{bmatrix} -\dfrac{H_F + r_F}{r_F} & \left\{ \left(\dfrac{\alpha_{XF} - \alpha_{\theta F} r_F}{r_F}\right)\dfrac{K_{TF}}{K_{SF}} + \dfrac{\eta_F \omega_F}{r_F}\dfrac{1}{s} \right\} \\ -\dfrac{H_R + r_R}{r_G} & \left\{ \left(\dfrac{\alpha_{XR} - \alpha_{\theta R} r_R}{r_R}\right)\dfrac{K_{TR}}{K_{SR}} + \dfrac{\eta_R \omega_R}{r_R}\dfrac{1}{s} \right\} e^{-\frac{L}{U}s} \end{bmatrix}^{-1} \quad (66)$$

$$\begin{bmatrix} (-\Delta\omega_1 + \Delta\omega_2)/2 \\ (-\Delta\omega_3 + \Delta\omega_4)/2 \end{bmatrix}$$

As will be understood from the above descriptions, in the third embodiment, a vertical speed $Z_{BG}$*s, a pitch angular speed $\theta_{BG}$*s, a roll angular speed $\varphi_{BG}$*s and a yaw angular speed $\psi_{BG}$*s of the sprung can as well be calculated only on the basis of wheel speeds $\Delta\omega$ of the four wheels. An in-phase component and a reverse phase component of vertical strokes of the suspensions 16 of the front wheels can be calculated on the basis of wheel speeds $\Delta\omega$, and on the basis of these values, vertical speeds $Z_{A1}$*s-$Z_{A4}$*s of the usprungs of the wheels 12 can be calculated.

Thus, according to the third embodiment, as information about strokes Z of the suspensions 16 is not necessary, the stroke sensors 32FL-32RR that are required in the first and second embodiments can be omitted. Consequently, as compared to the first and second embodiments, the number of necessary sensors can be reduced; the structure of the vehicle state estimation device 10 can be simplified; and a cost of the device can be reduced.

Fourth Embodiment

The fourth embodiment is constructed as a modification of the above described third embodiment. In the fourth embodiment, changes in radiuses of the tires 13 of the wheels caused by deformations thereof are ignored. Accordingly, the above Formula (66) in the third embodiment is replaced with the following Formula (67.)

$$\begin{bmatrix} \theta_{BG} \\ \Delta_{TFD} \end{bmatrix} s = \quad (67)$$

$$\begin{bmatrix} -\dfrac{H_F + r_F}{r_F} & \left\{ \left(\dfrac{\alpha_{XF} - \alpha_{\theta F} r_F}{r_F}\right)\dfrac{K_{TF}}{K_{SF}} \right\} \\ -\dfrac{H_R + r_R}{r_R} & \left\{ \left(\dfrac{\alpha_{XR} - \alpha_{\theta R} r_R}{r_R}\right)\dfrac{K_{TR}}{K_{SR}} \right\} e^{-\frac{L}{U}s} \end{bmatrix}^{-1} \begin{bmatrix} (\Delta\omega_1 + \Delta\omega_2)/2 \\ (\Delta\omega_3 + \Delta\omega_4)/2 \end{bmatrix}$$

The above Formula (67) can be rewritten as the following Formula (68) and can further be rewritten as the following Formula (69.)

$$\begin{bmatrix} \theta_{BG} \\ \Delta_{TFD} \end{bmatrix} s = \dfrac{1}{D}\begin{bmatrix} \left(\dfrac{\alpha_{XR} - \alpha_{\theta R} r_R}{r_R}\right)\dfrac{K_{TRD}}{K_{SRD}}e^{-\frac{L}{U}s} & -\left(\dfrac{\alpha_{XF} - \alpha_{\theta F} r_F}{r_F}\right)\dfrac{K_{TFD}}{K_{SFD}} \\ \dfrac{H_R + r_R}{r_R} & -\dfrac{H_F + r_F}{r_F} \end{bmatrix} \quad (68)$$

$$\begin{bmatrix} (\Delta\omega_1 + \Delta\omega_2)/2 \\ (\Delta\omega_3 + \Delta\omega_4)/2 \end{bmatrix}$$

$$\begin{bmatrix} \theta_{BG} \\ \Delta_{TFD} \end{bmatrix} s = \dfrac{1}{D}\begin{bmatrix} \left(\dfrac{\alpha_{XR} - \alpha_{\theta R} r_R}{r_R}\right)\dfrac{K_{TRD}}{K_{SRD}}e^{-\frac{L}{U}s}(\Delta\omega_1 + \Delta\omega_2)/2 - \\ \left(\dfrac{\alpha_{XF} - \alpha_{\theta F} r_F}{r_F}\right)\dfrac{K_{TFD}}{K_{SFD}}(\Delta\omega_3 + \Delta\omega_4)/2 \\ \dfrac{H_R + r_R}{r_R}(\Delta\omega_1 + \Delta\omega_2)/2 - \dfrac{H_F + r_F}{r_F}(\Delta\omega_3 + \Delta\omega_4)/2 \end{bmatrix} \quad (69)$$

According to the relationship of the second line in the above Formula (69) and the above Formulae (44) and (50), the following Formula (70) holds.

$$\begin{bmatrix} \Delta_{SFD} \\ \Delta_{SRD} \end{bmatrix} s = \begin{bmatrix} \dfrac{K_{TFD}}{K_{SFD}} \\ \dfrac{K_{TRD}}{K_{SRD}}e^{-\frac{L}{U}s} \end{bmatrix} \Delta_{TFD}s \quad (70)$$

$$= \dfrac{1}{D}\begin{bmatrix} \dfrac{K_{TFD}}{K_{SFD}} \\ \dfrac{K_{TRD}}{K_{SRD}}e^{-\frac{L}{U}s} \end{bmatrix} \begin{bmatrix} \dfrac{H_R + r_R}{r_R}(\Delta\omega_1 + \Delta\omega_2)/2 - \\ \dfrac{H_F + r_F}{r_F}(\Delta\omega_3 + \Delta\omega_4)/2 \end{bmatrix}$$

$$= \dfrac{1}{D}\begin{bmatrix} \dfrac{K_{TFD}}{K_{SFD}}\dfrac{H_R + r_R}{r_R} & -\dfrac{K_{TFD}}{K_{SFD}}\dfrac{H_F + r_F}{r_F} \\ \dfrac{K_{TRD}}{K_{SRD}}\dfrac{H_R + r_R}{r_R}e^{-\frac{L}{U}s} & -\dfrac{K_{TRD}}{K_{SRD}}\dfrac{H_F + r_F}{r_F}e^{-\frac{L}{U}s} \end{bmatrix}$$

$$\begin{bmatrix} (\Delta\omega_1 + \Delta\omega_2)/2 \\ (\Delta\omega_3 + \Delta\omega_4)/2 \end{bmatrix}$$

According to the relationship of the first line in the above Formula (68) and the above Formula (70), the following Formula (71) holds.

$$\begin{bmatrix} \theta_{BG} \\ \Delta_{SFD} \\ \Delta_{SRD} \end{bmatrix} s = \dfrac{1}{D}\begin{bmatrix} \left(\dfrac{\alpha_{XR} - \alpha_{\theta R} r_R}{r_R}\right)\dfrac{K_{TRD}}{K_{SRD}}e^{-\frac{L}{U}s} & -\left(\dfrac{\alpha_{XF} - \alpha_{\theta F} r_F}{r_F}\right)\dfrac{K_{TFD}}{K_{SFD}} \\ \dfrac{K_{TFD}}{K_{SFD}}\dfrac{H_R + r_R}{r_R} & -\dfrac{K_{TFD}}{K_{SFD}}\dfrac{H_F + r_F}{r_F} \\ \dfrac{K_{TFD}}{K_{SFD}}\dfrac{H_R + r_R}{r_R}e^{-\frac{L}{U}s} & -\dfrac{K_{TRD}}{K_{SRD}}\dfrac{H_F + r_F}{r_F}e^{-\frac{L}{U}s} \end{bmatrix} \quad (71)$$

$$\begin{bmatrix} (\Delta\omega_1 + \Delta\omega_2)/2 \\ (\Delta\omega_3 + \Delta\omega_4)/2 \end{bmatrix}$$

In similar, the above Formula (63) in the second and third embodiments is replaced with the following Formula (72.)

$$\begin{bmatrix} \theta_{BG} \\ \Delta_{TFD} \end{bmatrix} s = \quad (72)$$

$$\begin{bmatrix} -\dfrac{H_F + r_F}{r_F} & \left\{ \left(\dfrac{\alpha_{XF} - \alpha_{\theta F} r_F}{r_F}\right)\dfrac{K_{TFD}}{K_{SFD}} \right\} \\ -\dfrac{H_R + r_R}{r_R} & \left\{ \left(\dfrac{\alpha_{XR} - \alpha_{\theta R} r_R}{r_R}\right)\dfrac{K_{TRD}}{K_{SRD}} \right\} e^{-\frac{L}{U}s} \end{bmatrix}^{-1} \begin{bmatrix} (\Delta\omega_1 + \Delta\omega_2)/2 \\ (\Delta\omega_3 + \Delta\omega_4)/2 \end{bmatrix}$$

The above Formula (72) can be rewritten as the following Formula (73) and can further be rewritten as the following Formula (74.)

$$\begin{bmatrix} \theta_{BG} \\ \Delta_{TFD} \end{bmatrix} s = \dfrac{1}{D}\begin{bmatrix} \left(\dfrac{\alpha_{XR} - \alpha_{\theta R} r_R}{r_R}\right)\dfrac{K_{TRG}}{K_{SRG}}e^{-\frac{L}{U}s} & -\left(\dfrac{\alpha_{XF} - \alpha_{\theta F} r_F}{r_F}\right)\dfrac{K_{TFG}}{K_{SFG}} \\ \dfrac{W_R}{r_R} & -\dfrac{W_F}{r_F} \end{bmatrix} \quad (73)$$

$$\begin{bmatrix} (-\Delta\omega_1 + \Delta\omega_2)/2 \\ (-\Delta\omega_3 + \Delta\omega_4)/2 \end{bmatrix}$$

-continued $$\begin{bmatrix} \theta_{BG} \\ \Delta_{TFD} \end{bmatrix} s = \frac{1}{D} \begin{bmatrix} \left(\frac{\alpha_{XR} - \alpha_{\theta R} r_R}{r_R}\right)\frac{K_{TRG}}{K_{SRG}} e^{-\frac{L}{U}s}(-\Delta\omega_1 + \Delta\omega_2)/2 - \\ \left(\frac{\alpha_{XF} - \alpha_{\theta F} r_F}{r_F}\right)\frac{K_{TFG}}{K_{SFG}}(-\Delta\omega_3 + \Delta\omega_4)/2 \\ \frac{W_R}{r_R}(-\Delta\omega_1 + \Delta\omega_2)/2 - \frac{W_F}{r_F}(-\Delta\omega_3 + \Delta\omega_4)/2 \end{bmatrix} \quad (74)$$

According to the relationship of the second line in the above Formula (74) and the above Formulae (64) and (65), the following Formula (75) holds.

$$\begin{bmatrix} \Delta_{SFG} \\ \Delta_{SRG} \end{bmatrix} s = \begin{bmatrix} \frac{K_{TFG}}{K_{SFG}} \\ \frac{K_{TRG}}{K_{SRG}} e^{-\frac{L}{U}s} \end{bmatrix} \Delta_{TFG} s \quad (75)$$

$$= \frac{1}{D} \begin{bmatrix} \frac{K_{TFG}}{K_{SFG}} \\ \frac{K_{TRG}}{K_{SRG}} e^{-\frac{L}{U}s} \end{bmatrix} \begin{pmatrix} \frac{W_R}{r_R}(-\Delta\omega_1 + \Delta\omega_2)/2 - \\ \frac{W_F}{r_F}(-\Delta\omega_3 + \Delta\omega_4)/2 \end{pmatrix}$$

$$= \frac{1}{D} \begin{bmatrix} \frac{K_{TFG}}{K_{SFG}} \frac{W_R}{r_R} & -\frac{K_{TFG}}{K_{SFG}} \frac{W_F}{r_F} \\ \frac{K_{TRG}}{K_{SRG}} \frac{W_R}{r_R} e^{-\frac{L}{U}s} & -\frac{K_{TRG}}{K_{SRG}} \frac{W_F}{r_F} e^{-\frac{L}{U}s} \end{bmatrix}$$

$$\begin{bmatrix} (-\Delta\omega_1 + \Delta\omega_2)/2 \\ (-\Delta\omega_3 + \Delta\omega_4)/2 \end{bmatrix}$$

According to the relationship of the first line in the above Formula (74) and the above Formula (75), the following Formula (76) holds.

$$\begin{bmatrix} \Psi_{BG} \\ \Delta_{SFG} \\ \Delta_{SRG} \end{bmatrix} s = \frac{1}{D} \begin{bmatrix} \left(\frac{\alpha_{XR} - \alpha_{\theta R} r_R}{r_R}\right)\frac{K_{TRG}}{K_{SRG}} e^{-\frac{L}{U}s} & -\left(\frac{\alpha_{XF} - \alpha_{\theta F} r_F}{r_F}\right)\frac{K_{TFG}}{K_{SFG}} \\ \frac{K_{TFG}}{K_{SFG}} \frac{W_R}{r_R} & -\frac{K_{TFG}}{K_{SFG}} \frac{W_F}{r_F} \\ \frac{K_{TRG}}{K_{SRG}} \frac{W_R}{r_R} e^{-\frac{L}{U}s} & -\frac{K_{TRG}}{K_{SRG}} \frac{W_F}{r_F} e^{-\frac{L}{U}s} \end{bmatrix} \quad (76)$$

$$\begin{bmatrix} (-\Delta\omega_1 + \Delta\omega_2)/2 \\ (-\Delta\omega_3 + \Delta\omega_4)/2 \end{bmatrix}$$

Figure 13:
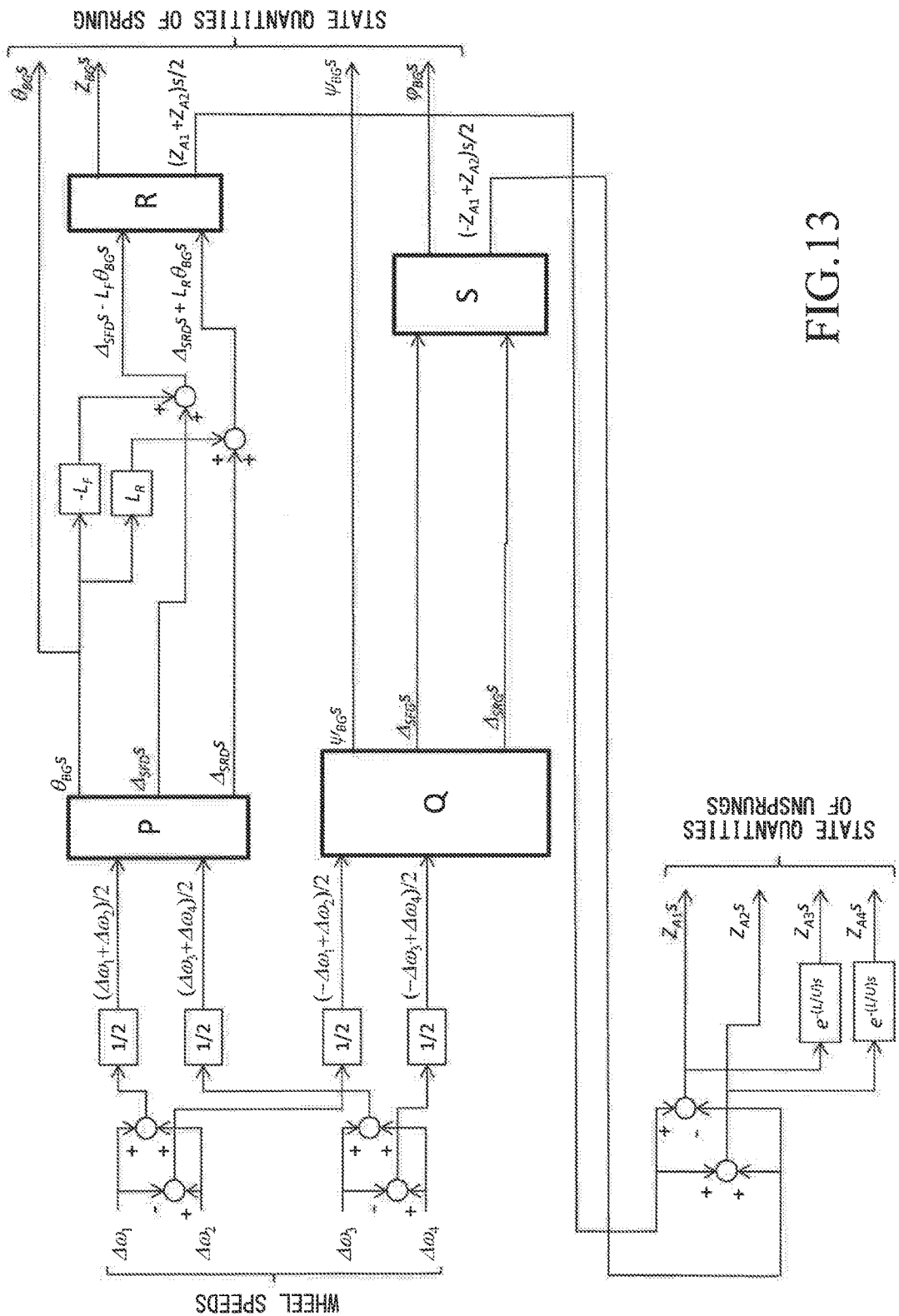
FIG. 13 illustrates a block diagram for use in a fourth embodiment with calculating various state quantities of the sprung and a state quantity (vertical speed) of the unsprung of each wheel.

"FIG. 13: Block Diagram for State Quantities Estimation"

FIG. 13 illustrates a block diagram for use in the fourth embodiment with estimating various state quantities of the sprung and further estimating vertical speeds of the unsprungs of the four wheels. The calculations of state quantities of the sprung and the like executed in accordance with the block diagram illustrated in FIG. 13 are also achieved by the electronic control unit 28.

As is understood by comparing FIGS. 13 and 12, in the block diagram in the fourth embodiment, as in the third embodiment, vertical strokes $Z_1$-$Z_4$ of the suspensions 16 of the wheels are not input. Consequently, state quantities of the sprung and the unsprungs which are the same as those that are calculated in the first to third embodiments can be calculated only on the basis of wheel speeds $\Delta\omega_1$-$\Delta\omega_4$ of the four wheels.

The calculation blocks P and Q execute the calculations of the above Formulae (71) and (76), respectively. As in the first to third embodiments, the calculation blocks R and S execute the calculations of the above Formulae (36) and (38), respectively.

Values input to the calculation block P are those which form the second matrix on the right side of the above Formula (71), i.e., an in-phase component of the wheel speeds $\Delta\omega$ of the front left and right wheels and an in-phase component of the wheel speeds $\Delta\omega$ of the rear left and right wheels. The calculation block P calculates a pitch angular speed $\theta_{BG}$*s of the sprung, a change rate $\Delta_{SFD}$*s of an in-phase component of vertical strokes of the front wheels and a change rate $\Delta_{SRD}$*s of an in-phase component of vertical strokes of the rear wheels by multiplying the first and second matrixes on the right side of the above Formula (71.)

Values input to the calculation block Q are those which form the second matrix on the right side of the above Formula (76), i.e., a reverse phase component of the wheel speeds $\Delta\omega$ of the front left and right wheels and a reverse phase component of the wheel speeds $\Delta\omega$ of the rear left and right wheels. The calculation block Q calculates a yaw angular speed $\psi_{BG}$*s of the sprung, a change rate $\Delta_{SFG}$*S of a reverse phase component of vertical strokes of the front wheels and a change rate $\Delta_{SRG}$*S of a reverse phase component of vertical strokes of the rear wheels by multiplying the first and the second matrixes on the right side of the above Formula (76.)

According to the fourth embodiment, changes in radiuses of the tires 13 of the wheels caused by deformations thereof are ignored. Consequently, state quantities of the sprung and the unsprungs can be estimated as in the third embodiment with reduced calculation load on the electronic control unit 28 as compared in the third embodiment.

According to the fourth embodiment, as in the third embodiment, the stroke sensors 32FL-32RR that are required in the first and second embodiment can be omitted. Consequently, as compared to the first and second embodiment, the number of necessary sensors can be reduced; the structure of the vehicle state estimation device 10 can be simplified; and a cost of the device can be reduced.

Although not referred to in the descriptions of the second to fourth embodiments, in these embodiments, as in the first embodiment, vertical displacements $Z_{o1}$-$Z_{o4}$ of a road surface at the positions of the four wheels are estimated in accordance with the control of the block diagram illustrated in FIG. 3.

As understood from the above descriptions, according to the first to fourth embodiments, a vertical speed $Z_{BG}$*s, a pitch angular speed $\theta_{BG}$*s, a roll angular speed $\varphi_{BG}$*s and a yaw angular speed $\psi_{BG}$*s of the sprung can be calculated without utilizing a vehicle model and correction thereof. Vertical speeds $Z_{A1}$*s-$Z_{A4}$*s of the usprungs of the wheels 12 can also be calculated without utilizing a vehicle model and correction thereof.

While the present invention has been described with reference to the above embodiments, it will be apparent to those skilled in the art that the present invention is not limited thereto, but may be embodied in various other forms without departing from the scope of the invention.

For example, while in the above-described embodiments, a vertical speed $Z_{BG}$*s, a pitch angular speed $\theta_{BG}$*s, a roll angular speed $\varphi_{BG}$*s and a yaw angular speed $\psi_{BG}$*s of the sprung are calculated, a calculation of any of the state quantities may be omitted.

While in the above-described embodiments, a longitudinal displacement $X_B$ of the sprung at the axle position TC is calculated as a total of the above three displacements $X_{Ba}$, $X_{Bb}$ and $X_{Bc}$ in accordance with the Formula (6), any of the three displacements may be omitted.

While in the above-described embodiments, a change speed $dZ_B$ of a vertical displacement of the sprung at the axle position TC is calculated in accordance with the Formula (16), a vertical speed caused by a pitching of the sprung that is expressed by the second term or a vertical speed caused by a rolling of the sprung that is expressed by the third term may be omitted.

While in the above-described embodiments, vertical speeds $Z_{A1}$*s and $Z_{A2}$*s of the usprungs of the front wheels 12FL and 12FR, respectively are calculated and vertical speeds $Z_{A3}$*s and $Z_{A4}$*s of the usprungs of the rear wheels 12RL and 12RR, respectively are calculated, calculations of vertical speeds of the usprungs may be omitted.

In the above-described embodiments, vertical displacements $Z_{01}$-$Z_04$ of a road surface are calculated on the basis of a change rate $\Delta_{TFD}$*s of an in-phase deformation of the tires 13F of the front wheels 12F, a change rate $\Delta_{TFG}$*s of a reverse phase deformation of the tires 13F of the front wheels 12F, a vertical speed $(Z_{A1}+Z_{A2})s/2$ of the unsprungs of the front wheels and a roll speed $(-Z_{A1}+Z_{A2})s/2$ of the unsprungs of the front wheels. However, calculations of vertical displacements of a road surface may be omitted.

What is claimed is:

1. A vehicle state estimation device which is applied to a vehicle having four wheels, including front left and right wheels and rear left and right wheels, and a sprung including a portion of the vehicle body from which the wheels are suspended by suspensions that can expand and contract at least vertically, comprising:
    wheel speed detection devices that detect wheel speeds of the four wheels; and
    an electronic control unit (ECU) configured to:
    calculate state quantities of at least the sprung on the basis of detected wheel speeds of the four wheels;
    calculate an in-phase component of wheel speeds of left and right wheels and a reverse phase component of wheel speeds of left and right wheels for the front and rear wheels;
    calculate a pitch angular speed of the sprung and a yaw angular speed of the sprung on the basis of the in-phase component of wheel speeds of left and right wheels and the reverse phase component of wheel speeds of left and right wheels, respectively; and
    based on the calculated in-phase component, control an actuator of at least one shock absorber of the vehicle in order to control the damping force of the at least one shock absorber.

2. A vehicle state estimation device according to claim 1, wherein:
    the ECU is further configured to:
    acquire information of vertical strokes of the suspensions of the four wheels caused by expansions and contractions of the suspensions, and
    calculate an in-phase component of vertical strokes of the left and right suspensions and a reverse phase component of vertical strokes of the left and right suspensions for the front and rear wheels, and
    calculate a vertical speed of the sprung and a roll angular speed of the sprung on the basis of the in-phase component of vertical strokes of left and right suspensions and the reverse phase component of vertical strokes of left and right suspensions, respectively.

3. A vehicle state estimation device according to claim 1, wherein:
    the four wheels include tires,
    the ECU is further configured to, on the presupposition that a vertical transmitting force of each tire is the same as a vertical transmitting force of the associated suspension:
    calculate an in-phase component of vertical strokes of left and right suspensions and a reverse phase component of vertical strokes of left and right suspensions for the front and rear wheels on the basis of wheel speeds of the four wheels, and
    calculate a vertical speed of the sprung and a roll angular speed of the sprung on the basis of the in-phase component of vertical strokes of left and right suspensions and the reverse phase component of vertical strokes of left and right suspensions, respectively.

4. A vehicle state estimation device according to claim 2, wherein:
    the ECU is further configured to:
    calculate an in-phase component of vertical speeds of unsprungs of the front left and right wheels on the basis of the pitch angular speed of the sprung and the in-phase component of vertical strokes of left and right suspensions for the front and rear wheels,
    calculate a reverse phase component of vertical speeds of the unsprungs of the front left and right wheels on the basis of the reverse phase component of vertical strokes of left and right suspensions for the front and rear wheels, to calculate vertical speeds of unsprungs of the front left and right wheels on the basis of the in-phase component of vertical speeds of the unsprungs of the front left and right wheels and the reverse phase component of vertical speeds of the unsprungs of the front left and right wheels, and
    calculate vertical speeds of the unsprungs of the rear left and right wheels on the basis of a delay time that is a wheel base of the vehicle divided by a vehicle speed and the vertical speeds of the unsprungs of the front left and right wheels.

5. A vehicle state estimation device according to claim 4, wherein:
    the ECU is further configured to:
    calculate vertical displacements of a road surface at positions of the front left and right wheels on the basis of the in-phase component of vertical speeds of the unsprungs of the front left and right wheels and the reverse phase component of vertical speeds of the unsprungs of the front left and right wheels, and
    calculate vertical displacements of the road surface at positions of the rear left and right wheels on the basis of the delay time and the vertical displacements of the road surface at positions of the front left and right wheels, respectively.

* * * * *